US011260329B2

United States Patent
Kim et al.

(10) Patent No.: US 11,260,329 B2
(45) Date of Patent: Mar. 1, 2022

(54) LAUNDRY DRYER

(71) Applicant: LG Electronics Inc., Seoul (KR)

(72) Inventors: Minseong Kim, Seoul (KR); Jinhyouk Shin, Seoul (KR); Jungwan Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 16/311,184

(22) PCT Filed: Jun. 9, 2017

(86) PCT No.: PCT/KR2017/006041
§ 371 (c)(1),
(2) Date: Dec. 19, 2018

(87) PCT Pub. No.: WO2017/222218
PCT Pub. Date: Dec. 28, 2017

(65) Prior Publication Data
US 2019/0338457 A1    Nov. 7, 2019

(30) Foreign Application Priority Data
Jun. 23, 2016   (KR) .................... 10-2016-0078649

(51) Int. Cl.
*B01D 46/00*   (2006.01)
*D06F 58/04*   (2006.01)
(Continued)

(52) U.S. Cl.
CPC ......... *B01D 46/00* (2013.01); *B01D 46/0005* (2013.01); *B01D 46/0071* (2013.01);
(Continued)

(58) Field of Classification Search
CPC .......... D06F 58/22; D06F 58/04; D06F 58/20; D06F 58/02; B01D 46/0071; B01D 46/00; B01D 46/0005; F26B 25/007
(Continued)

(56) References Cited

U.S. PATENT DOCUMENTS 3,043,015 A * 7/1962 Brucken ................. D06F 58/22
                                                    34/80
3,922,752 A * 12/1975 Holm ..................... D06B 15/04
                                                    15/307
(Continued)

FOREIGN PATENT DOCUMENTS

DE    4344269 A1 *  7/1994  ......... B01D 46/0006
EP    3031977        6/2016
(Continued)

OTHER PUBLICATIONS

European Search Report dated Nov. 18, 2019.

*Primary Examiner* — Jorge A Pereiro
*Assistant Examiner* — Bao D Nguyen
(74) *Attorney, Agent, or Firm* — Finnegan, Henderson, Farabow, Garrett & Dunner, LLP

(57) ABSTRACT

A laundry dryer according to one embodiment of the present invention comprises: a drying drum having an opening formed at the front side thereof; a front cabinet erected at the front side of the drying drum, and having an input hole formed at a portion corresponding to the opening; and a filter assembly mounted at the back side of the front cabinet corresponding to the lower side of the input hole, and through which humid air discharged from the drying drum passes, wherein the filter assembly can comprise: a case having an exhaust hole formed at the back side thereof; a blocking filter coupled to the upper side of the case; a lint filter unit penetrating the blocking filter so as to be slidably inserted or withdrawn in a vertical direction; a cleaning
(Continued)

nozzle disposed at the front or rear of the lint filter unit; and a filter housing accommodated inside the case and disposed at the lower side of the lint filter unit.

13 Claims, 33 Drawing Sheets

(51) Int. Cl.
*D06F 58/22* (2006.01)
*D06F 58/20* (2006.01)

(52) U.S. Cl.
CPC .............. *D06F 58/04* (2013.01); *D06F 58/22* (2013.01); *D06F 58/20* (2013.01)

(58) Field of Classification Search
USPC .............................................. 34/79, 82, 480
See application file for complete search history.

(56) References Cited

U.S. PATENT DOCUMENTS

| | | | | | |
|---|---|---|---|---|---|
| 4,548,623 | A | * | 10/1985 | Naske | B01D 50/006 34/147 |
| 4,603,489 | A | * | 8/1986 | Goldberg | F26B 21/086 34/77 |
| 4,720,925 | A | * | 1/1988 | Czech | D06F 58/22 34/82 |
| 5,940,986 | A | * | 8/1999 | Jelinek | D06F 34/18 34/528 |
| 6,303,003 | B1 | * | 10/2001 | Webster | D21F 1/66 162/290 |
| 8,984,767 | B2 | * | 3/2015 | Grunert | D06F 58/22 34/407 |
| 9,062,410 | B2 | * | 6/2015 | Ahn | D06F 58/04 |
| 2004/0010936 | A1 | * | 1/2004 | Han | D06F 58/04 34/595 |
| 2005/0132603 | A1 | * | 6/2005 | Jeong | D06F 58/04 34/603 |
| 2006/0075577 | A1 | * | 4/2006 | Jeong | D06F 25/00 8/158 |
| 2006/0096335 | A1 | * | 5/2006 | Park | D06F 58/22 68/20 |
| 2006/0123854 | A1 | * | 6/2006 | Hong | D06F 58/22 68/19.1 |
| 2007/0089316 | A1 | * | 4/2007 | Kim | D06F 58/04 34/82 |
| 2008/0196268 | A1 | * | 8/2008 | Jung | D06F 58/22 34/603 |
| 2008/0216455 | A1 | * | 9/2008 | Aizawa | B01D 46/10 55/481 |
| 2008/0271336 | A1 | * | 11/2008 | Doh | D06F 58/22 34/82 |
| 2009/0064528 | A1 | * | 3/2009 | Kim | D06F 58/22 34/82 |
| 2010/0146803 | A1 | * | 6/2010 | Ahn | D06F 58/22 34/82 |
| 2010/0146804 | A1 | * | 6/2010 | Ahn | D06F 58/45 34/82 |
| 2010/0146812 | A1 | * | 6/2010 | Ahn | D06F 58/20 34/480 |
| 2010/0154241 | A1 | * | 6/2010 | Ahn | D06F 58/22 34/82 |
| 2010/0192397 | A1 | * | 8/2010 | Kim | F26B 21/086 34/73 |
| 2011/0016736 | A1 | * | 1/2011 | Kim | D06F 58/22 34/82 |
| 2011/0225837 | A1 | * | 9/2011 | Ahn | D06F 58/04 34/82 |
| 2011/0225838 | A1 | * | 9/2011 | Ahn | D06F 58/04 34/82 |
| 2011/0271542 | A1 | * | 11/2011 | Ko | D06F 58/22 34/90 |
| 2012/0144687 | A1 | * | 6/2012 | Yeom | D06F 58/22 34/82 |
| 2013/0145648 | A1 | * | 6/2013 | Kim | F26B 21/003 34/524 |
| 2013/0255101 | A1 | * | 10/2013 | Lee | F26B 25/009 34/443 |
| 2014/0059877 | A1 | * | 3/2014 | Ryu | D06F 58/20 34/132 |
| 2015/0247279 | A1 | * | 9/2015 | Bison | D06F 58/22 34/82 |
| 2015/0284897 | A1 | * | 10/2015 | Reid | D06F 58/22 34/82 |
| 2016/0115639 | A1 | * | 4/2016 | Kim | D06F 58/22 34/82 |
| 2016/0138209 | A1 | * | 5/2016 | Kitayama | D06F 58/20 34/499 |
| 2017/0165600 | A1 | * | 6/2017 | Ishikawa | B01D 46/0005 |
| 2017/0350064 | A1 | * | 12/2017 | Shin | D06F 58/24 |
| 2018/0236390 | A1 | * | 8/2018 | Kim | B01D 46/0042 |
| 2018/0282933 | A1 | * | 10/2018 | Woodham, Jr. | D06F 58/22 |
| 2020/0129908 | A1 | * | 4/2020 | Choi | B01D 46/0024 |

FOREIGN PATENT DOCUMENTS

| | | | | |
|---|---|---|---|---|
| EP | 3282049 | A1 | * 2/2018 | ............ D06F 58/22 |
| EP | 3366825 | A1 | * 8/2018 | ........... D06F 58/206 |
| EP | 3366827 | A1 | * 8/2018 | ........... D06F 58/206 |
| EP | 3366828 | A1 | * 8/2018 | ............ D06F 58/22 |
| EP | 3366829 | A1 | * 8/2018 | ............ D06F 58/24 |
| JP | 11132117 | A | * 5/1999 | ............ B01D 46/10 |
| JP | 20021139291 | | 4/2002 | |
| JP | 2016107025 | | 6/2016 | |
| KR | 10-2009-0102415 | | 9/2009 | |
| KR | 10-2011-0122466 | | 11/2011 | |
| KR | 10-2015-0039630 | | 4/2015 | |
| KR | 10-2016-0006064 | | 1/2016 | |
| KR | 10-1588137 | | 1/2016 | |
| WO | WO-2018196178 | A1 | * 11/2018 | ............ D06F 58/22 |
| WO | WO-2019043965 | A1 | * 3/2019 | ............ D06F 58/22 |
| WO | WO-2019085738 | A1 | * 5/2019 | ............ B08B 3/02 |

* cited by examiner

[Fig. 1]
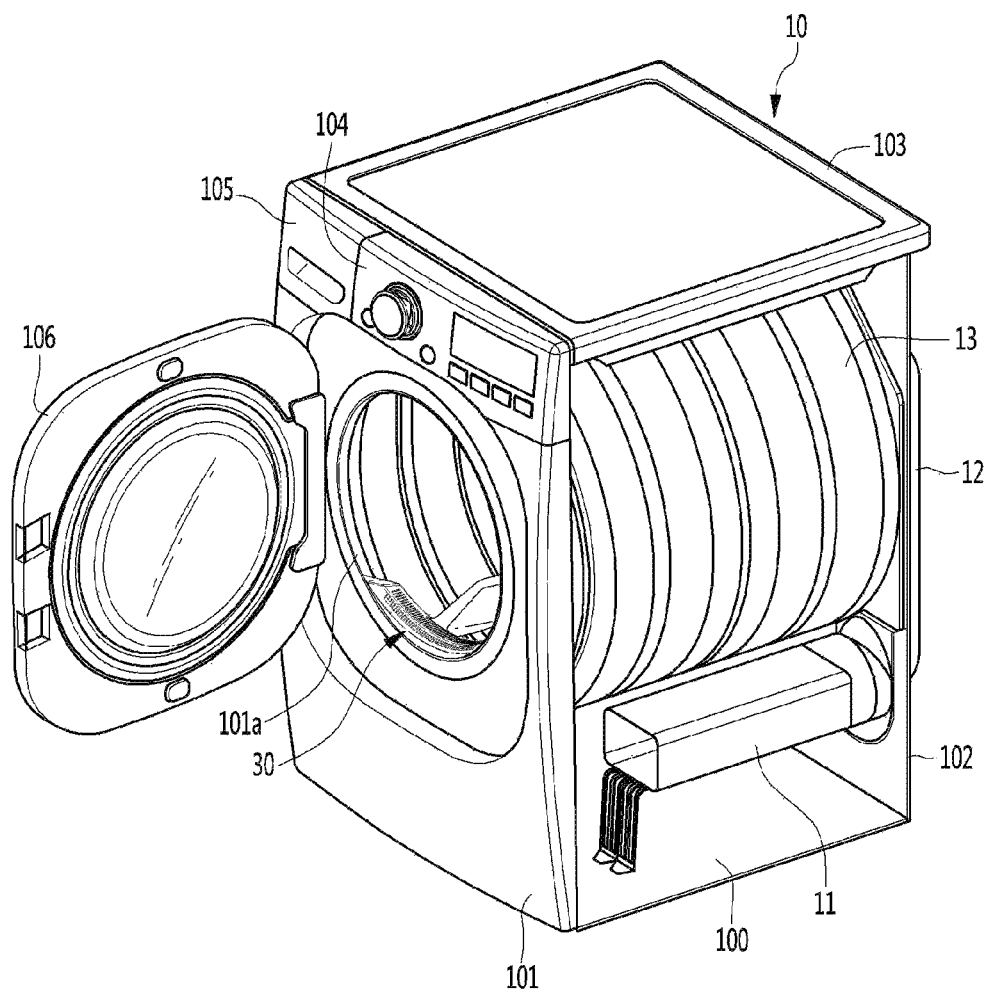

[Fig. 2]
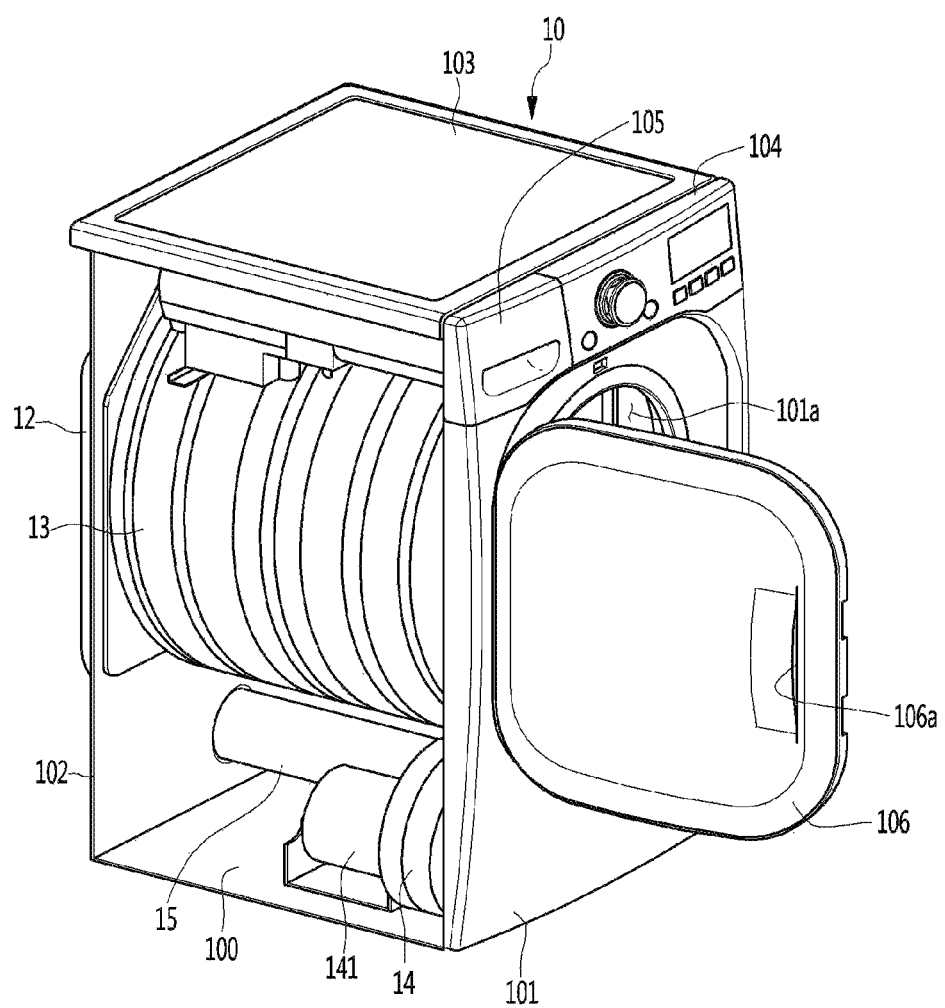

[Fig. 3]
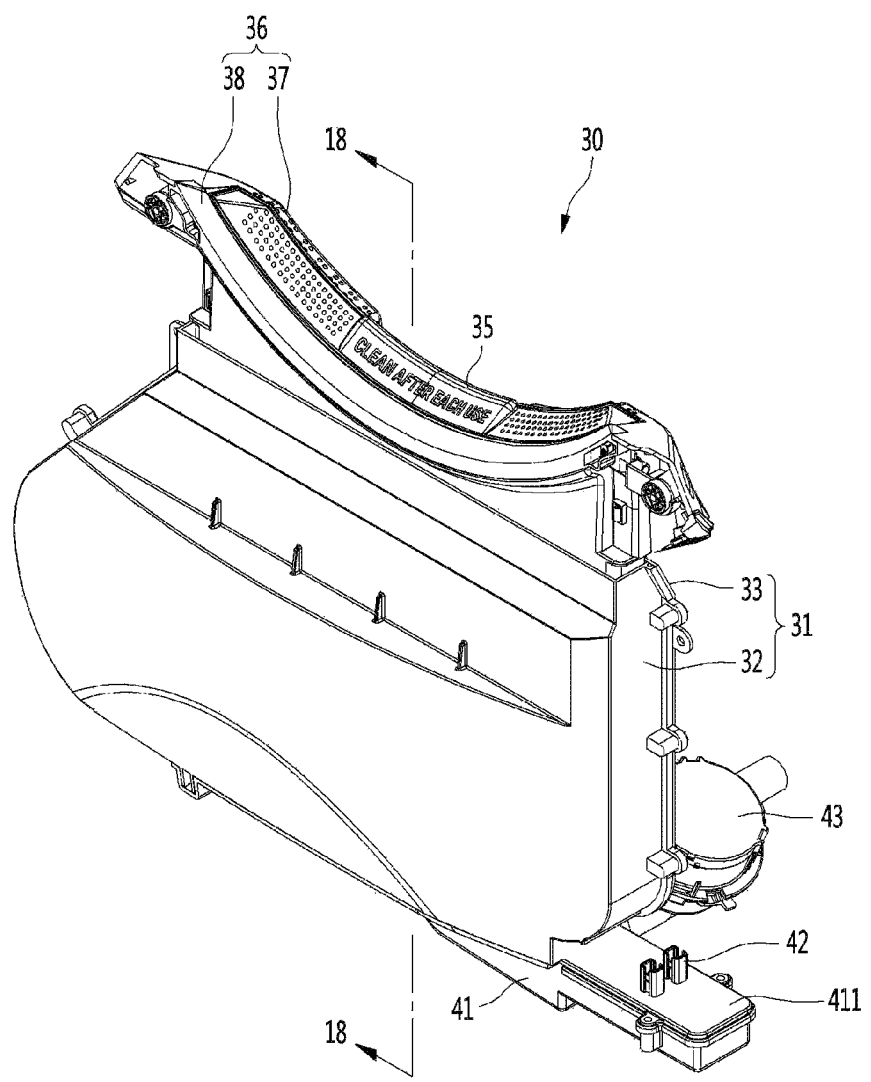

【Fig. 4】
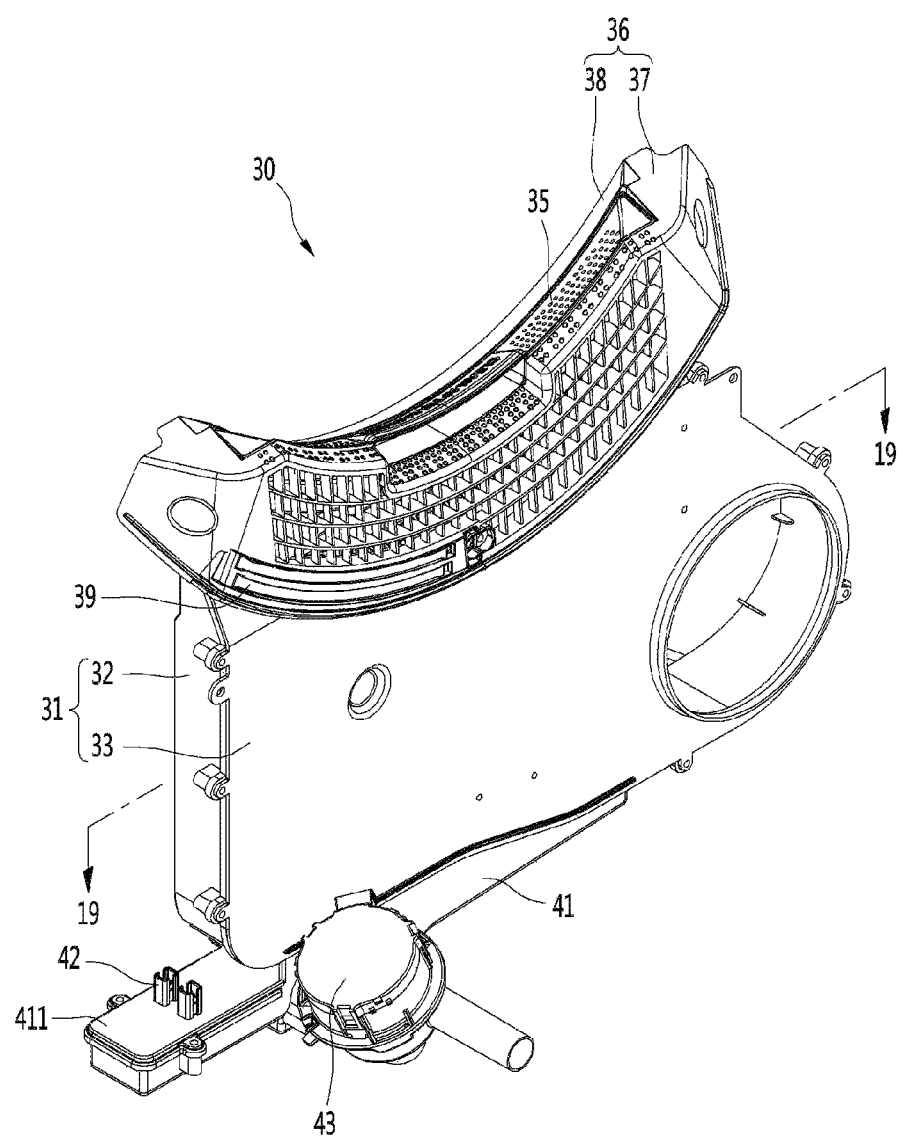

[Fig. 5]
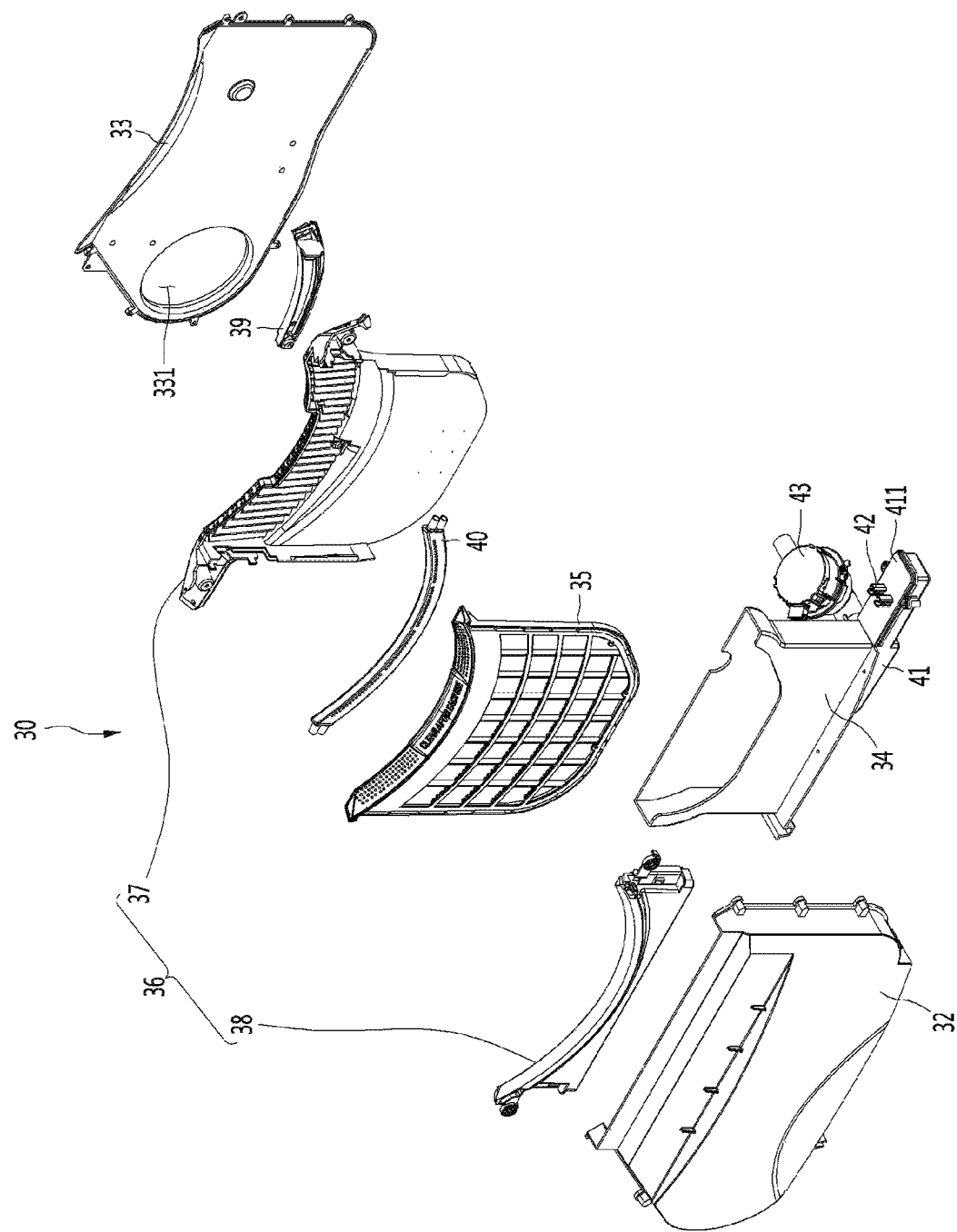

[Fig. 6]
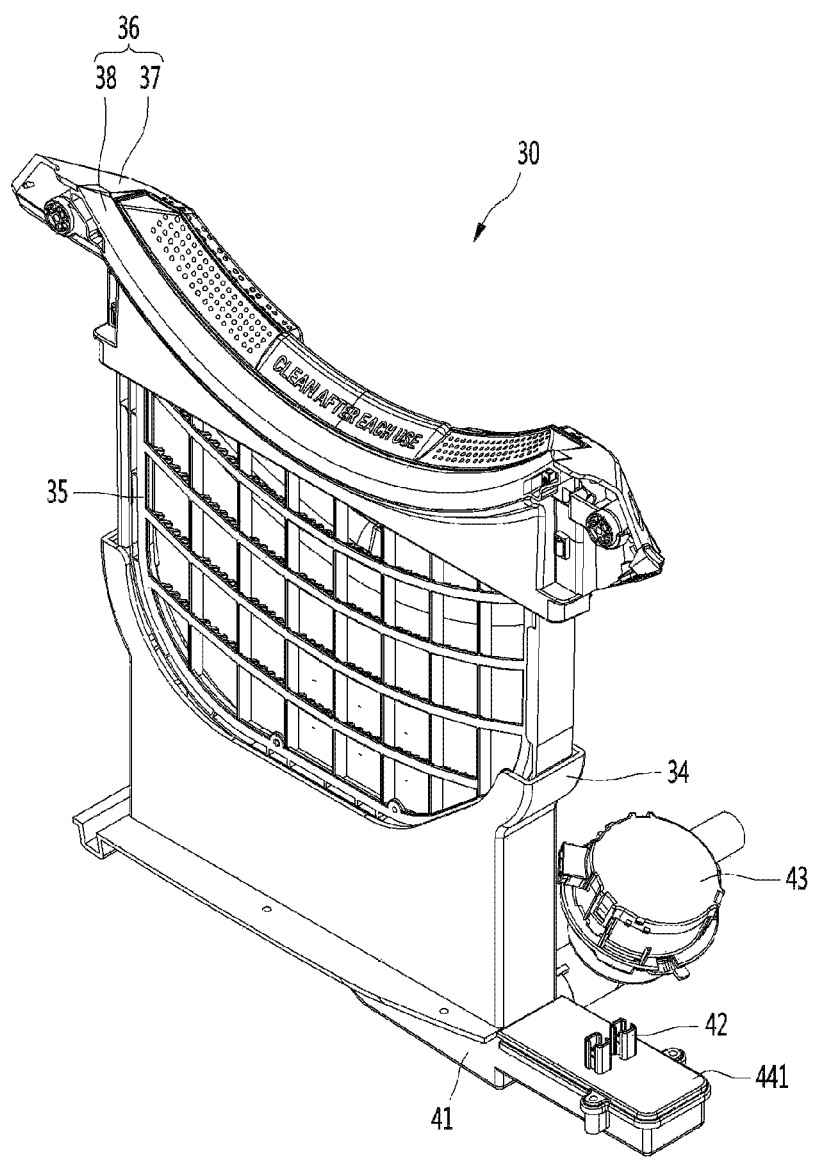

[Fig. 7]
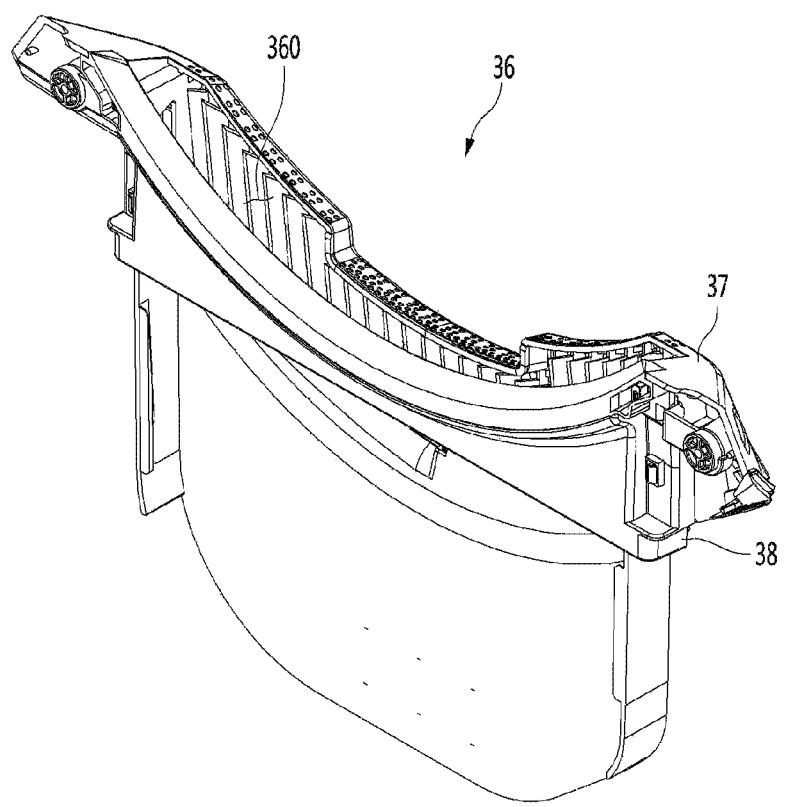

【Fig. 8】
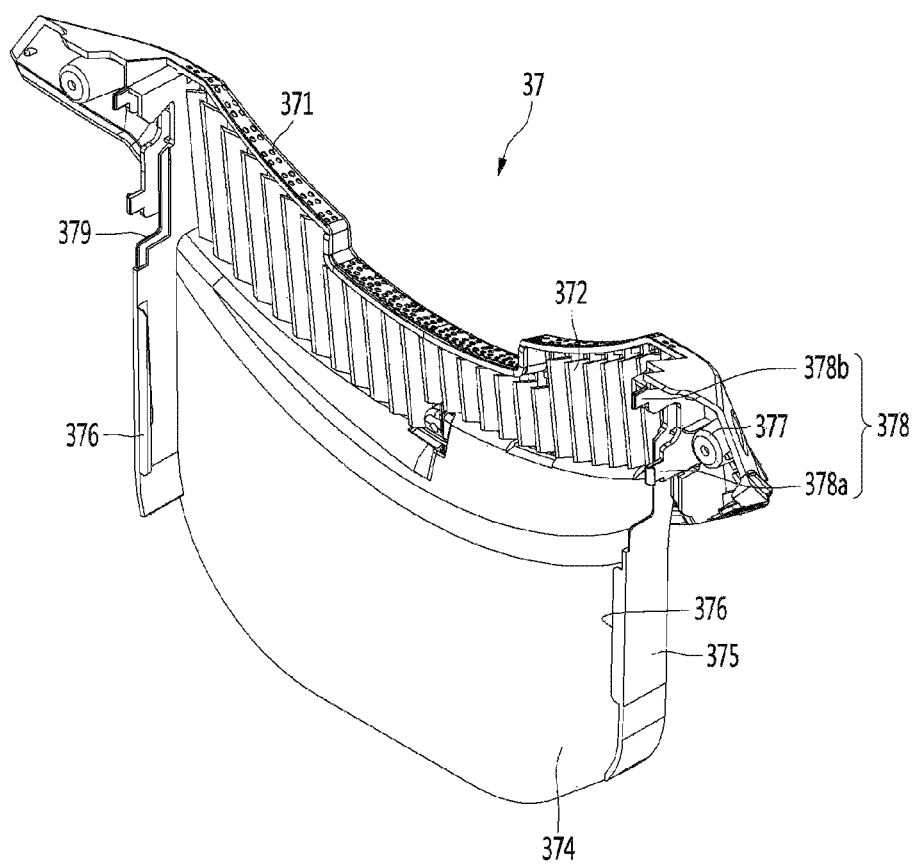

[Fig. 9]
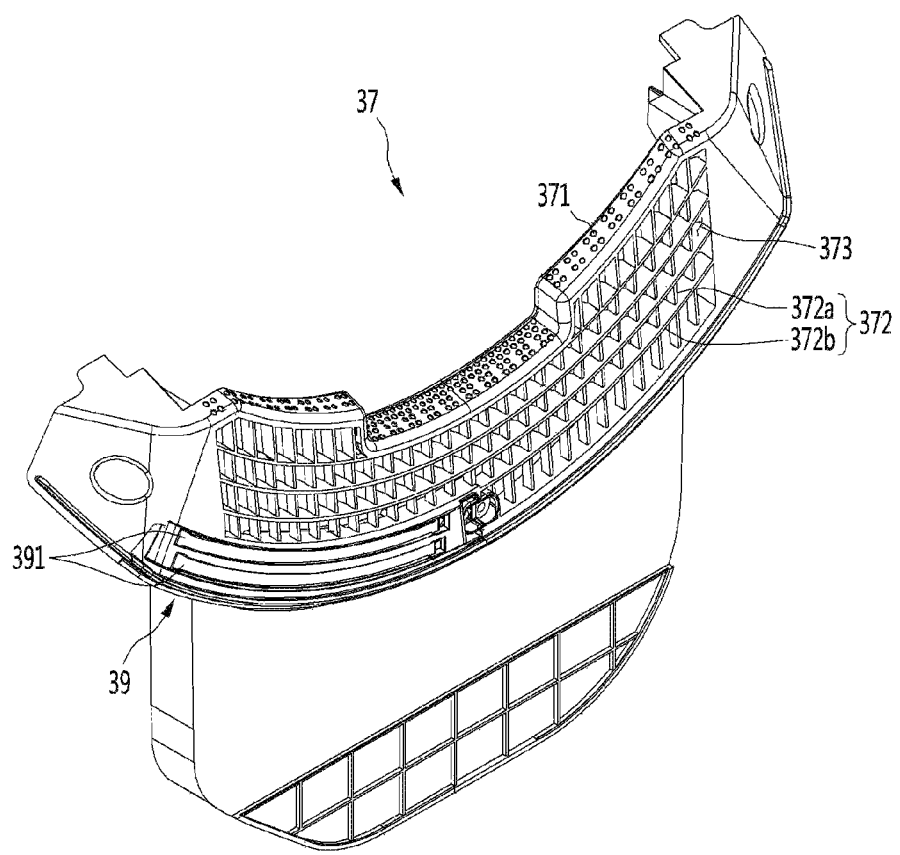

[Fig. 10]
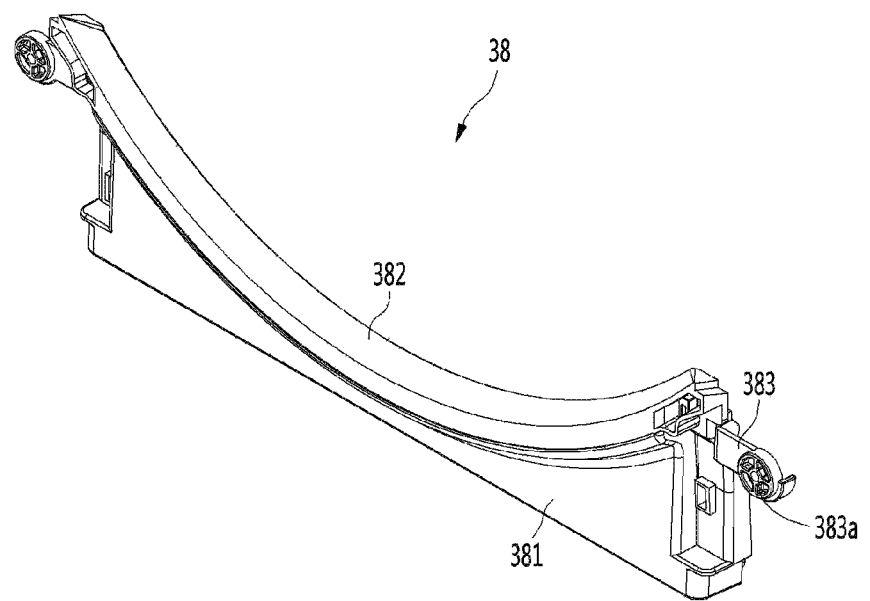

[Fig. 11]
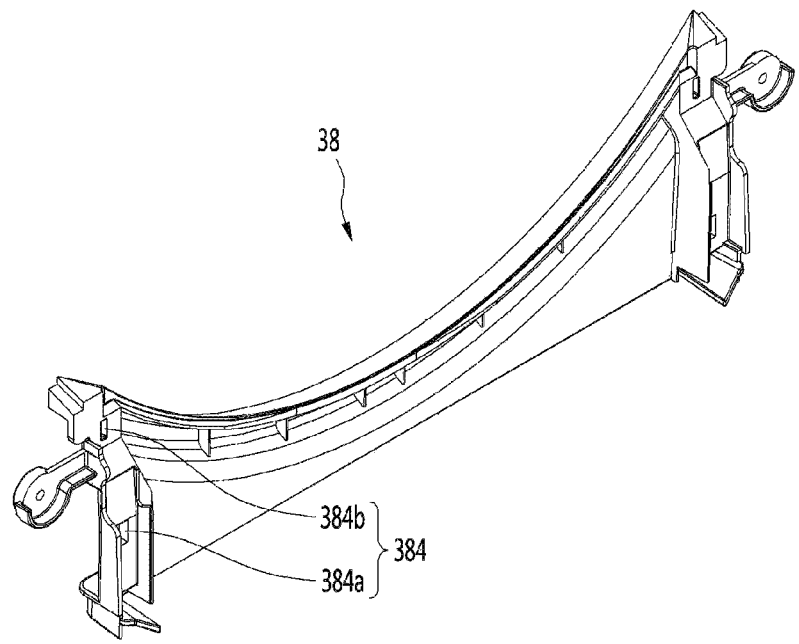

[Fig. 12]
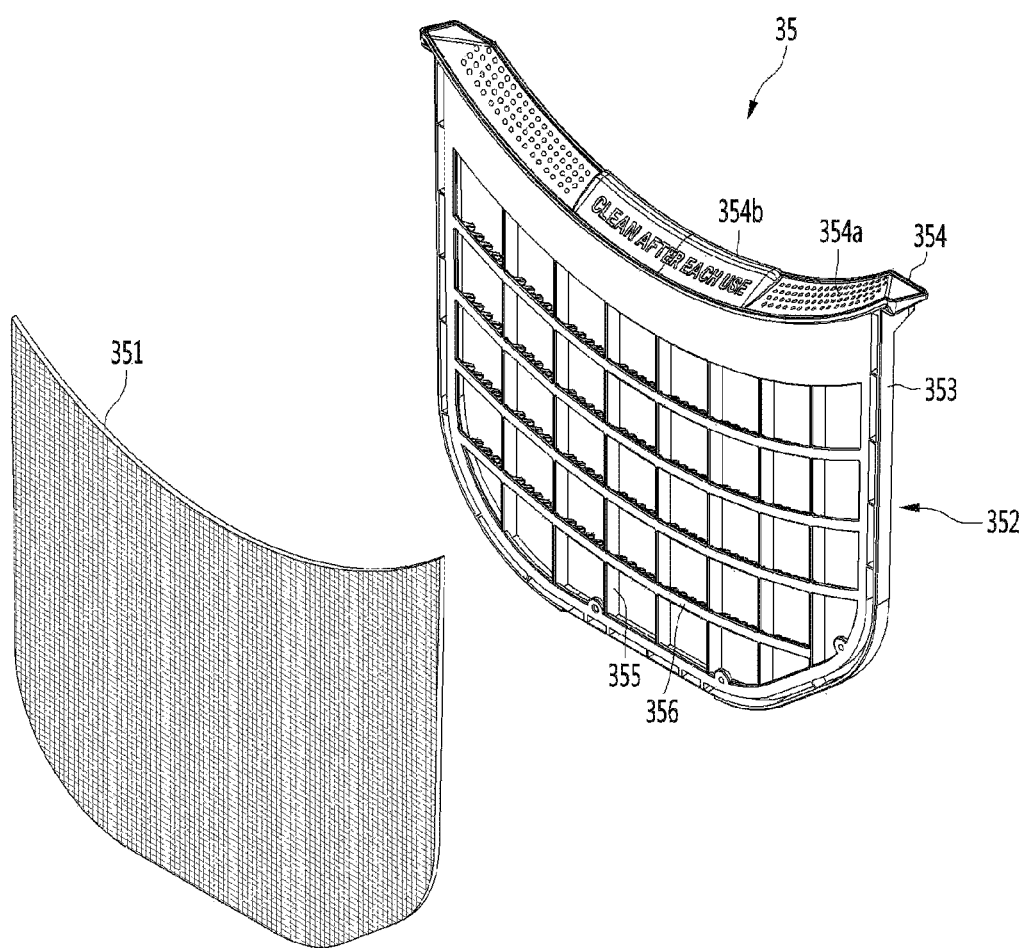

【Fig. 13】
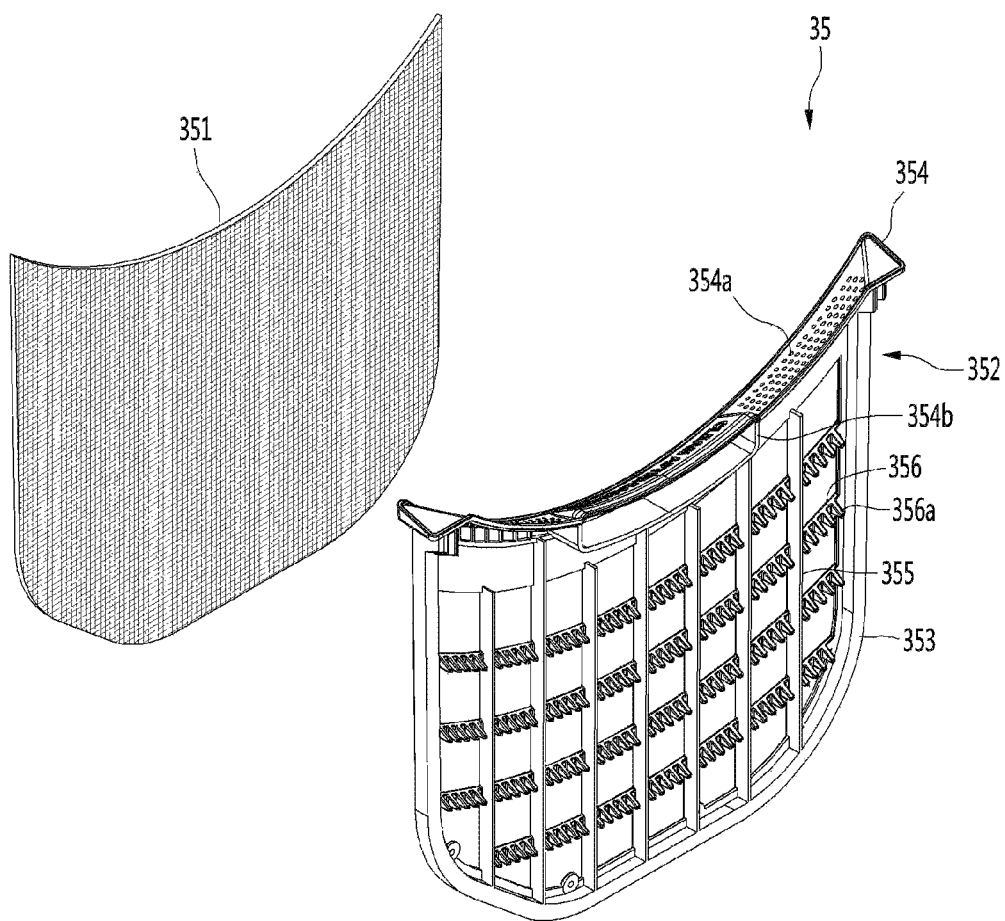

[Fig. 14]
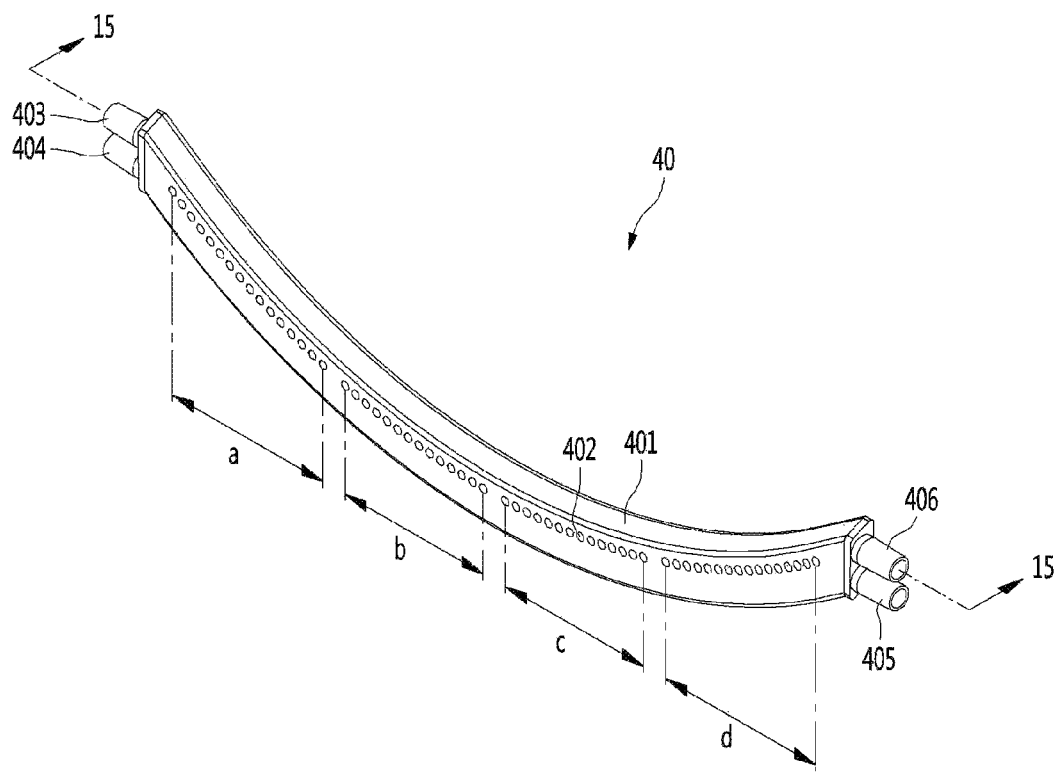

[Fig. 15]
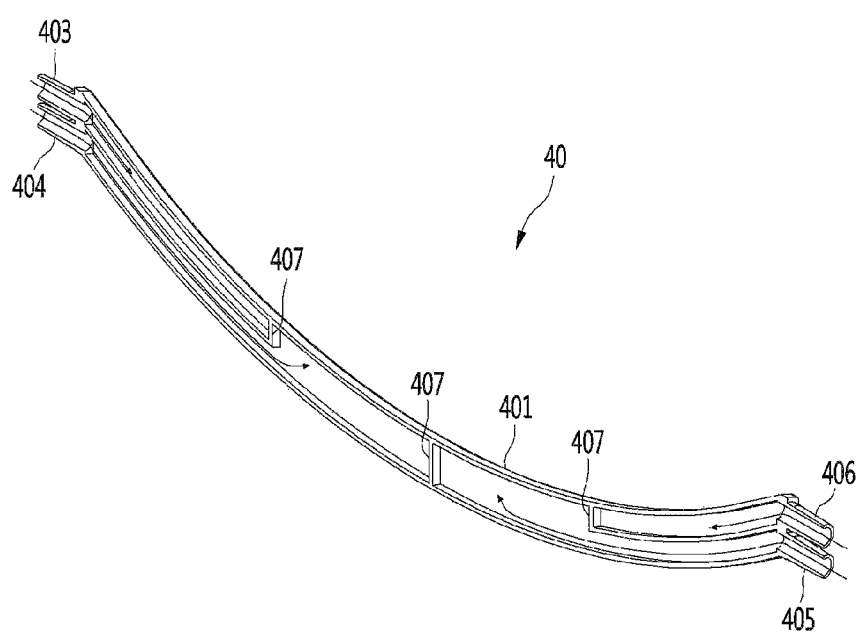

[Fig. 16]
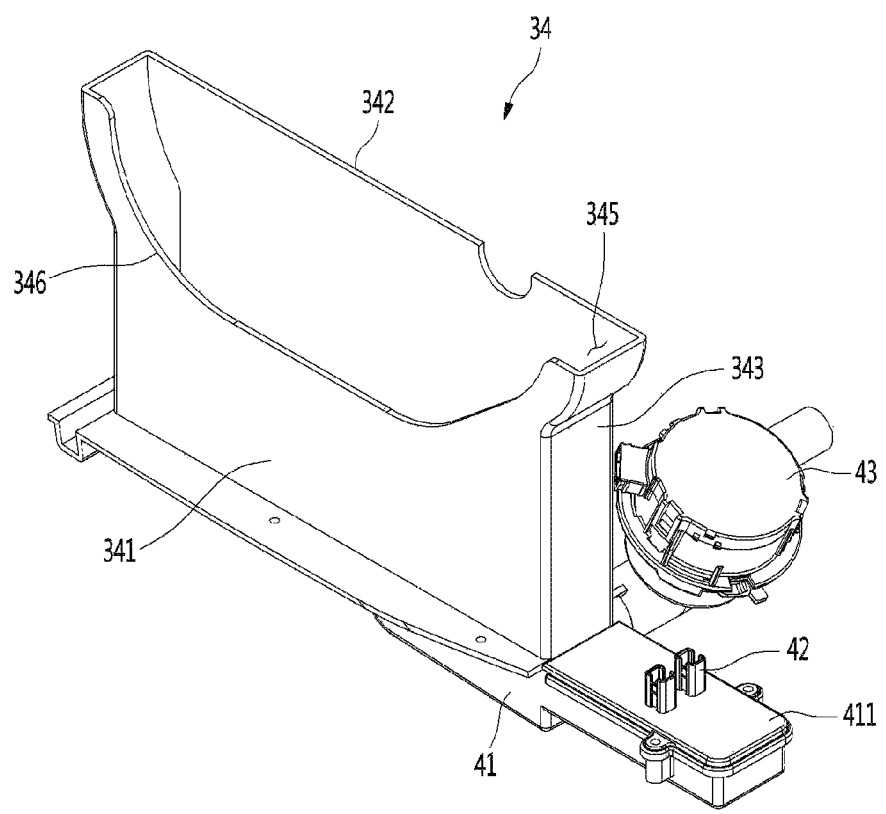

【Fig.17】
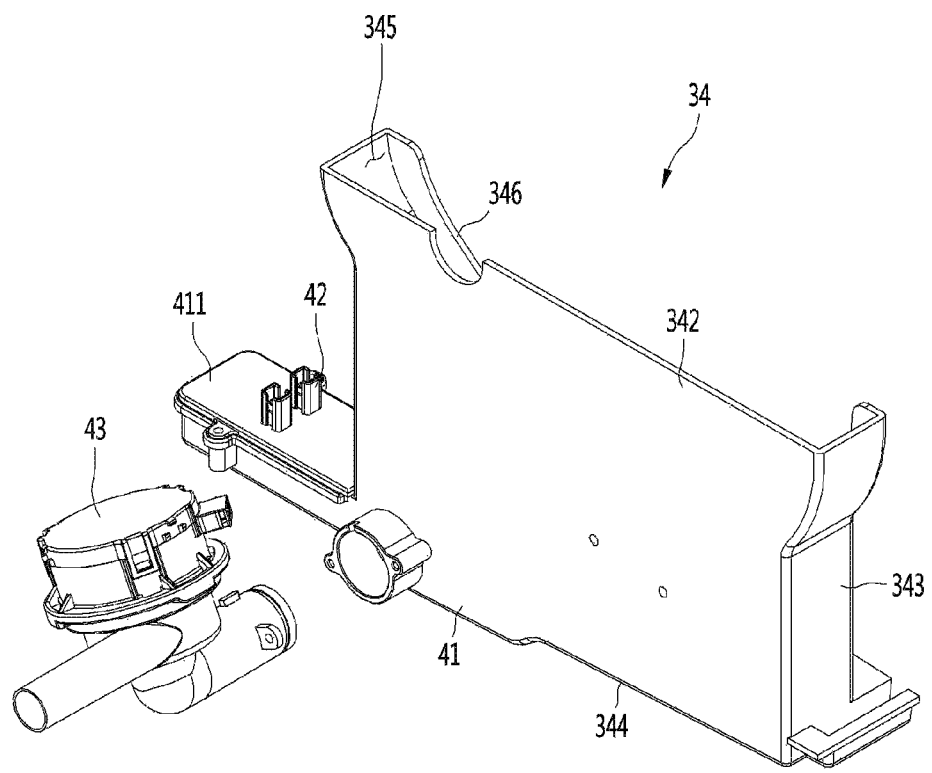

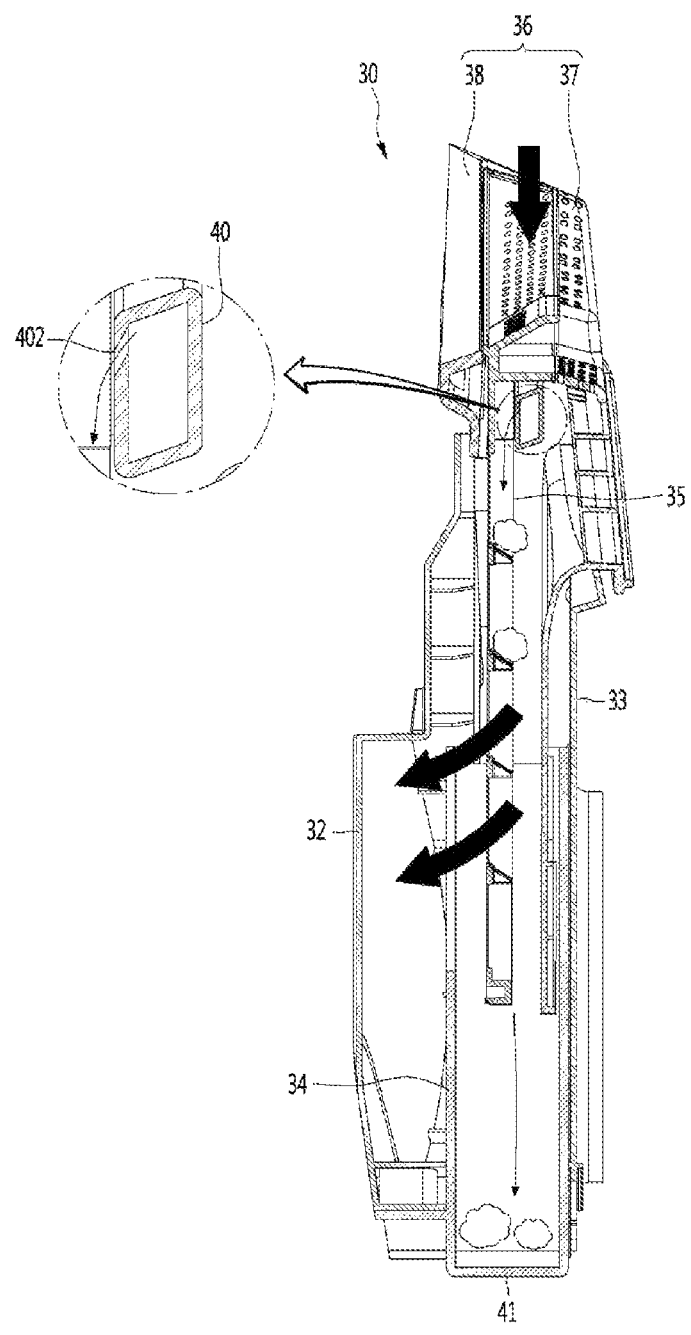
[Fig. 18]

[Fig. 19]
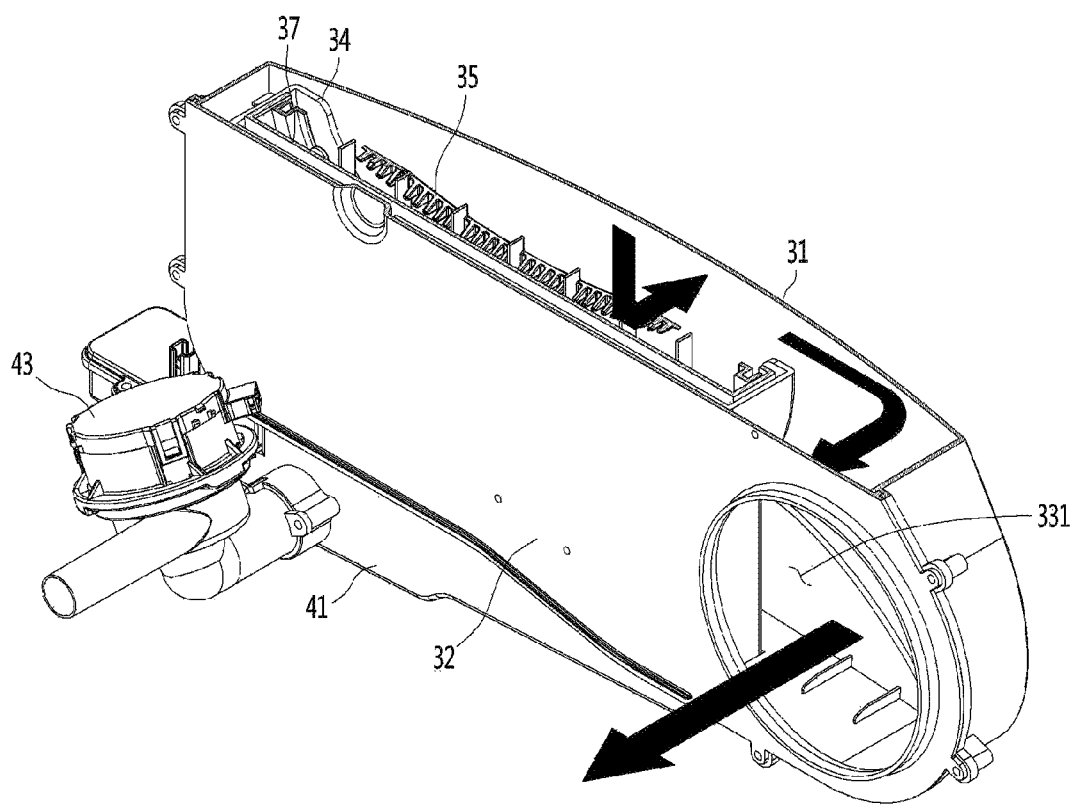

[Fig. 20]
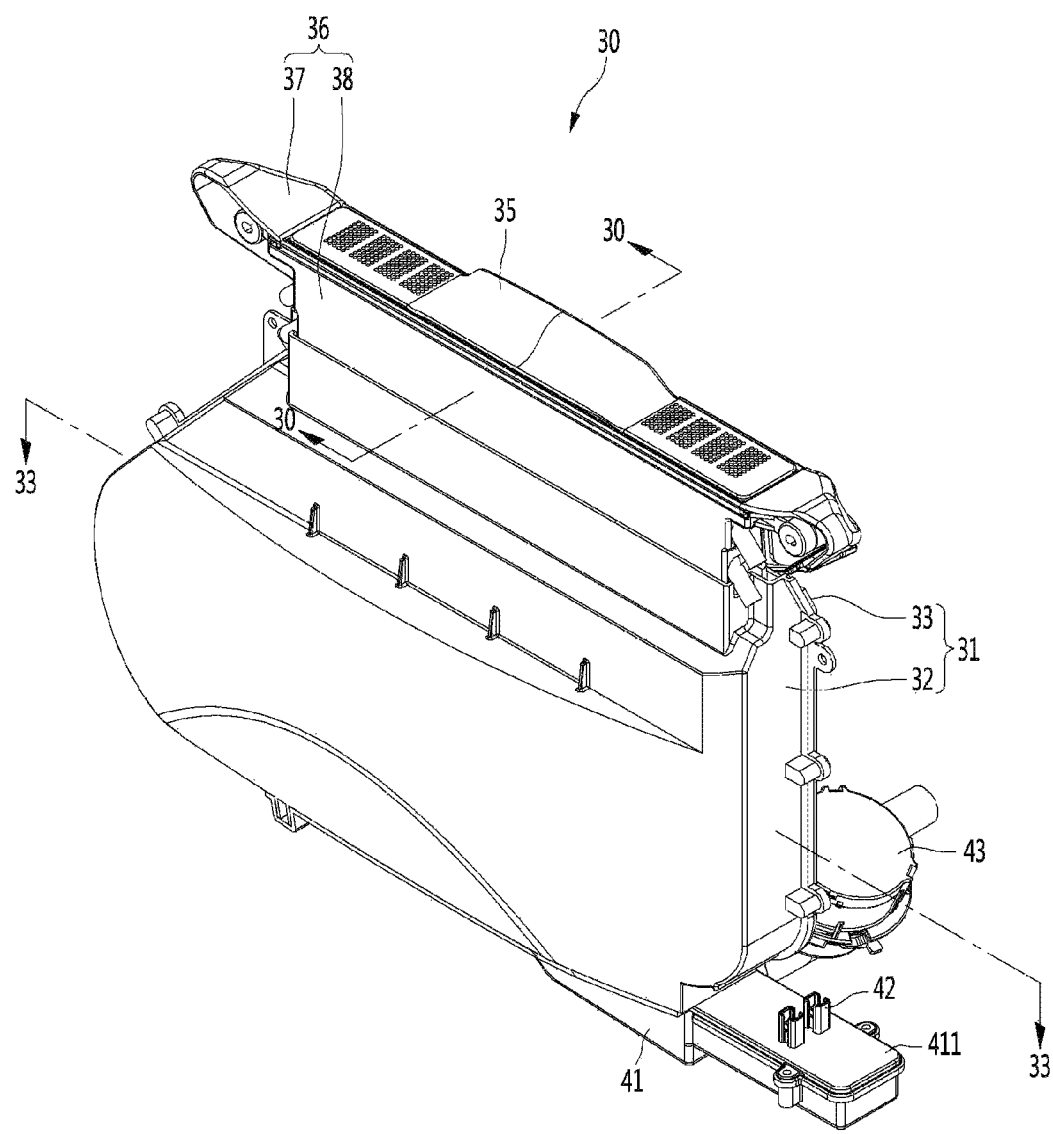

[Fig. 21]
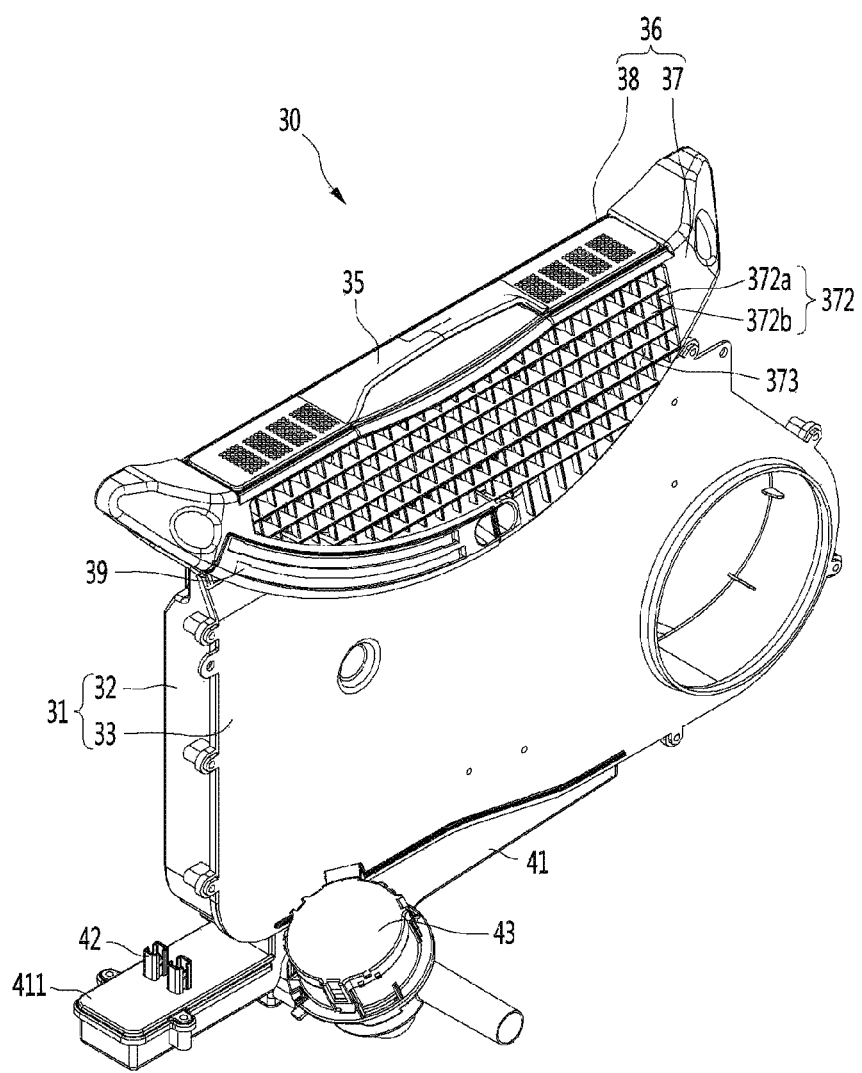

【Fig. 22】
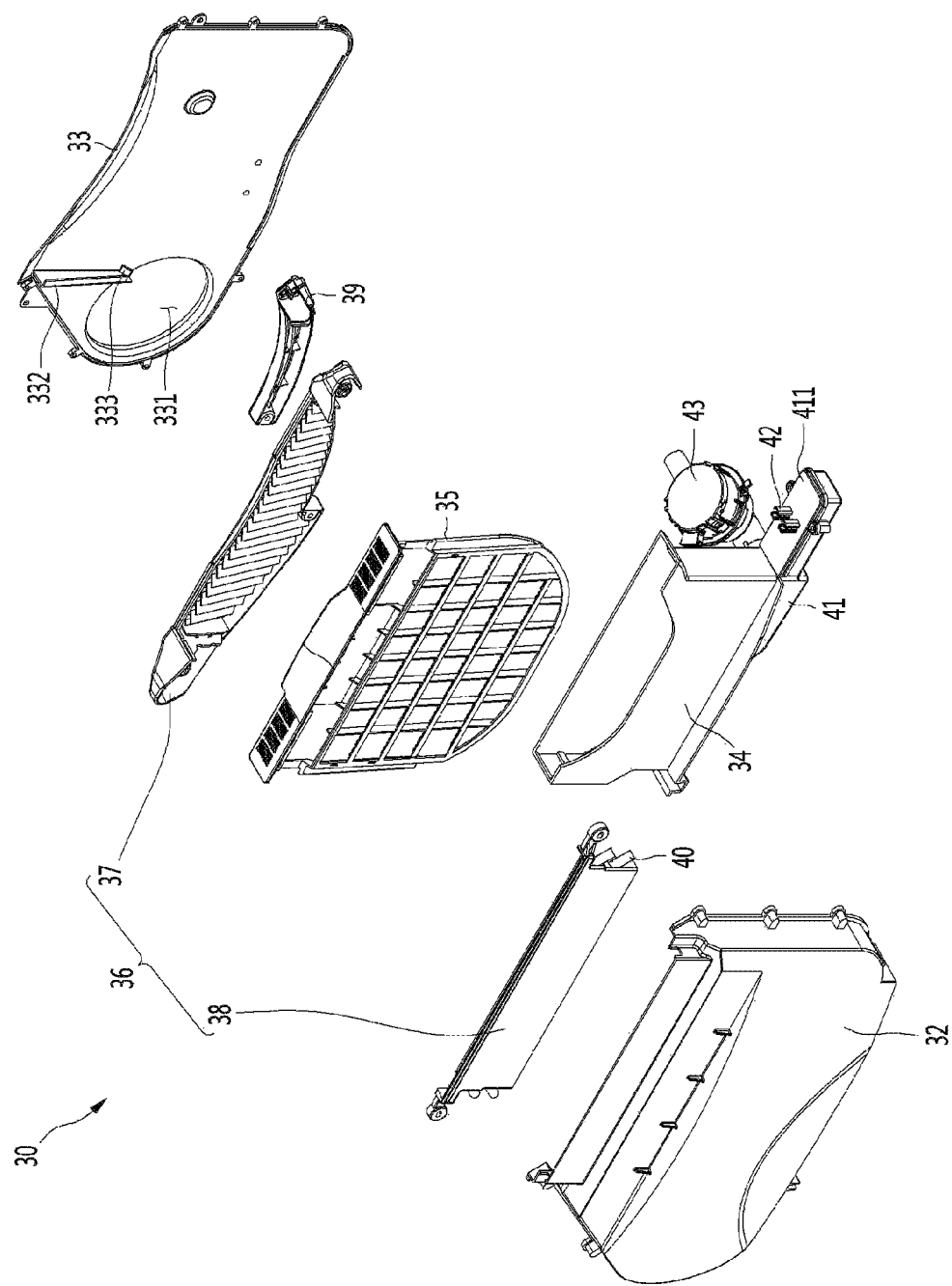

[Fig. 23]
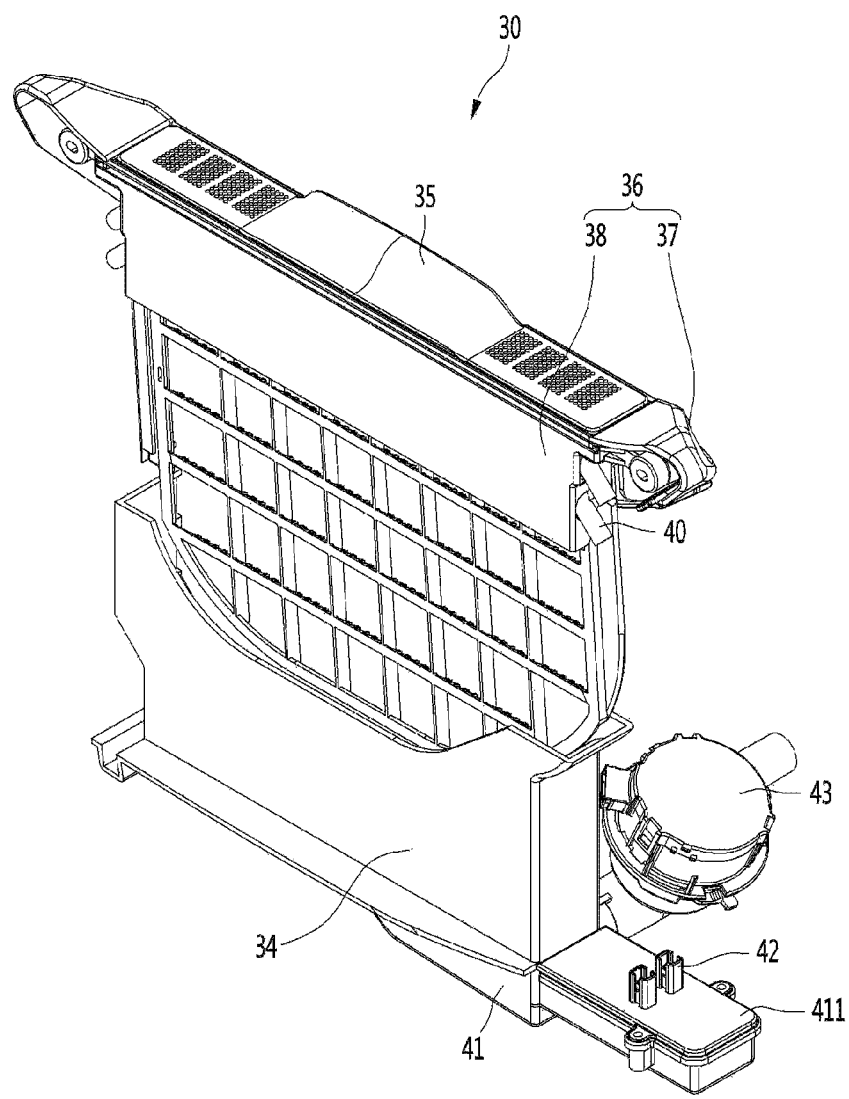

[Fig. 24]
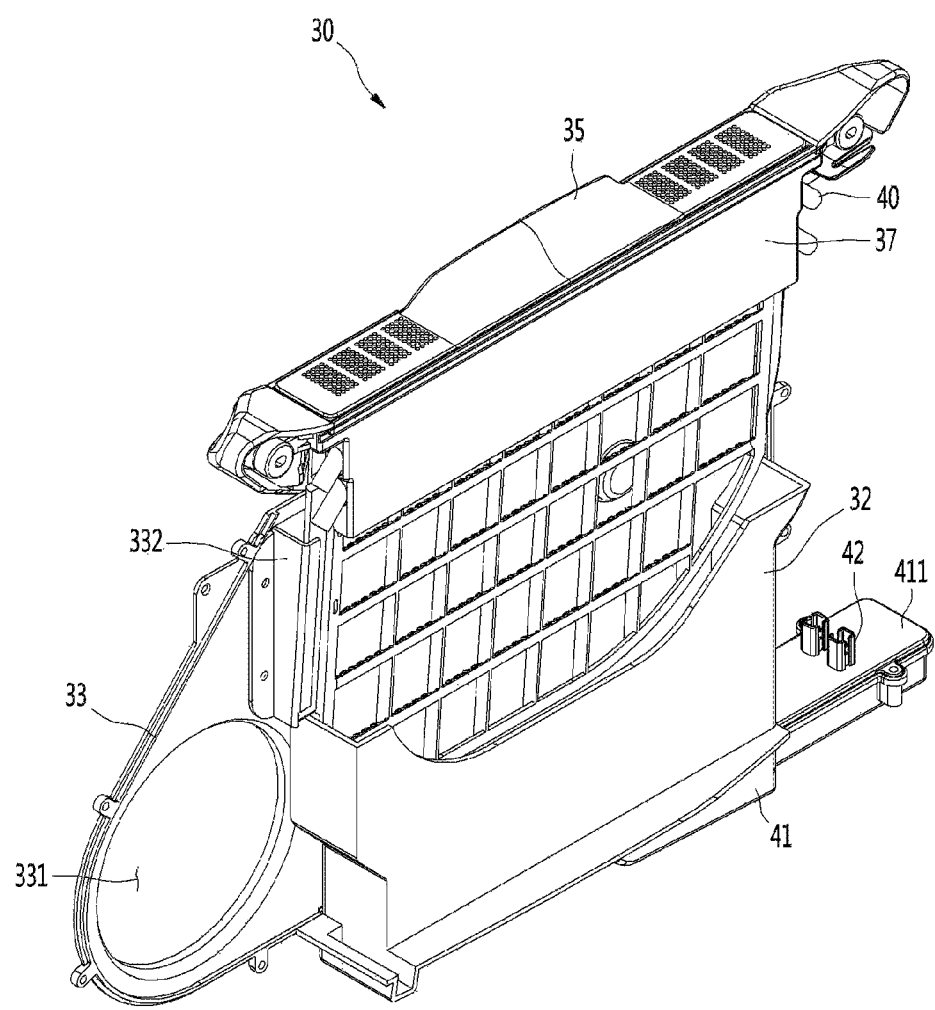

[Fig. 25]
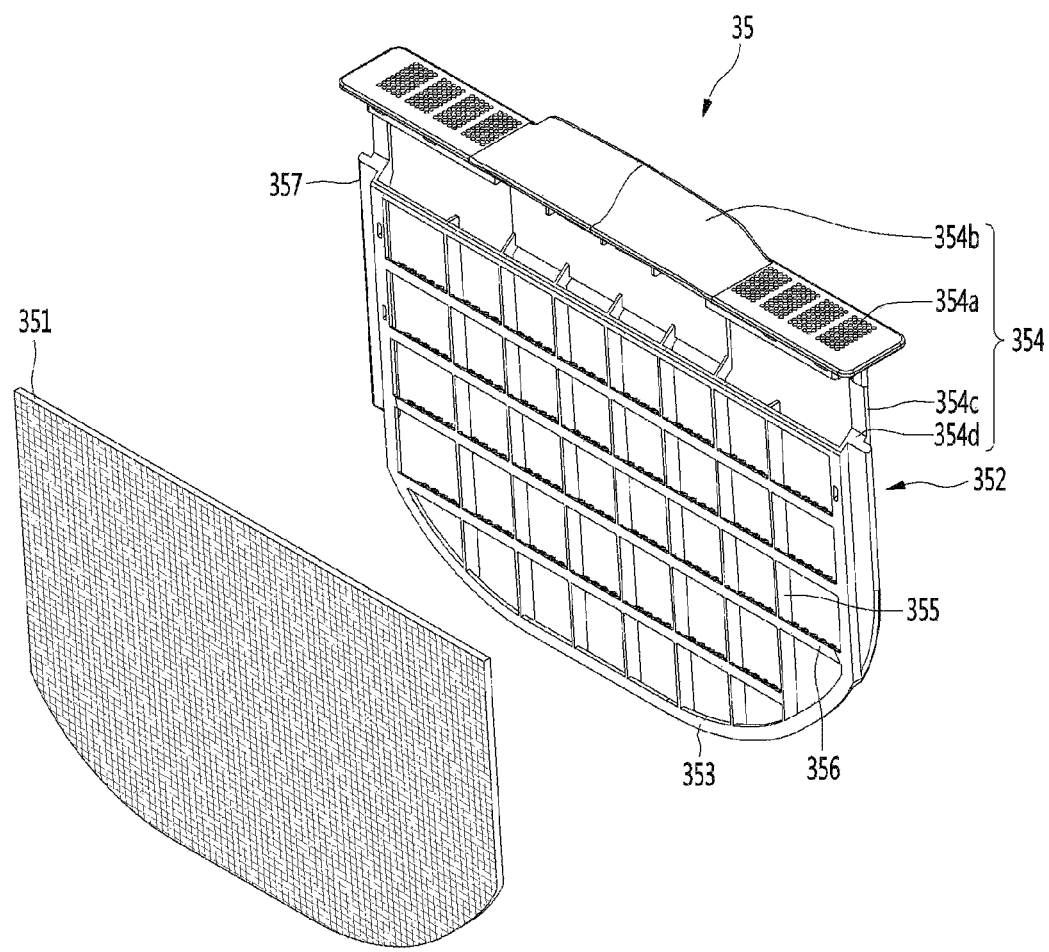

[Fig. 26]
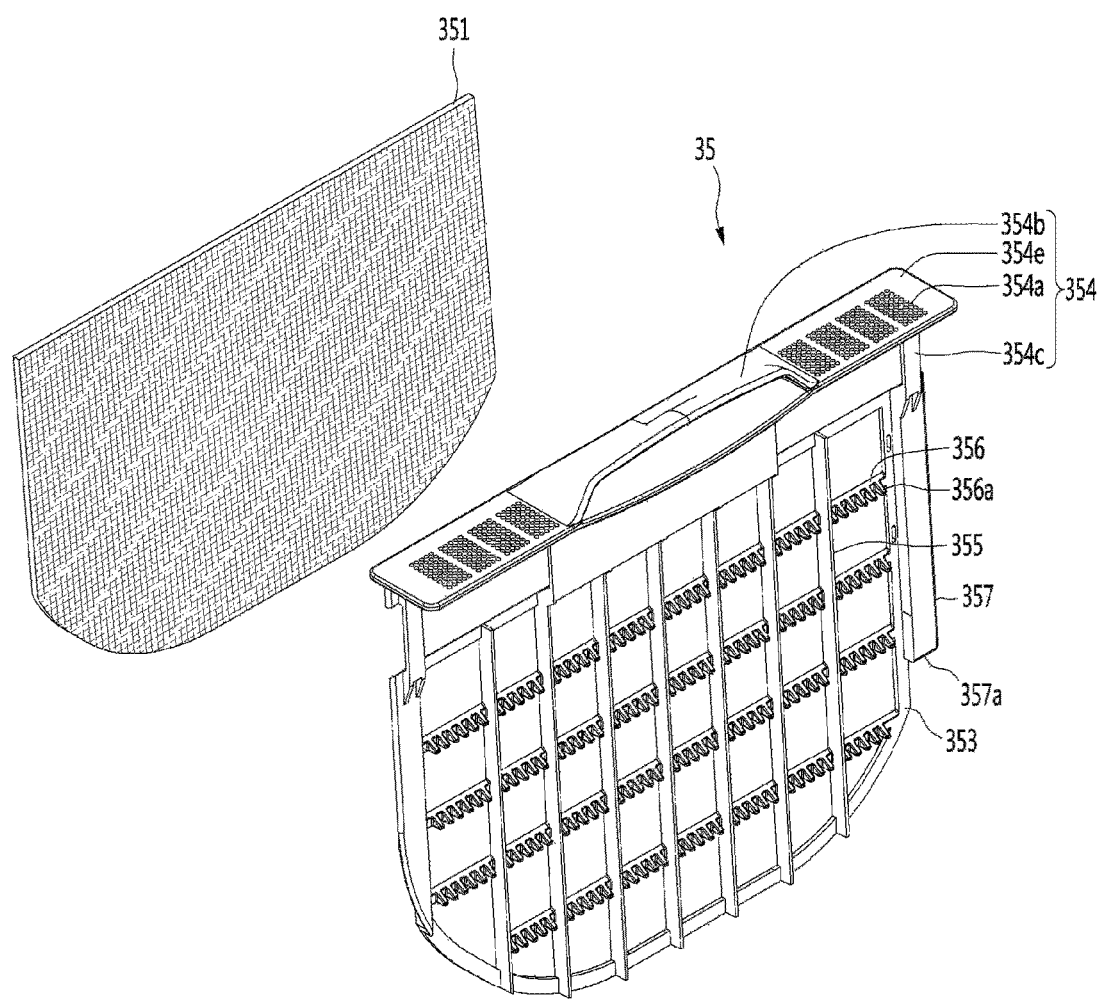

[Fig. 27]
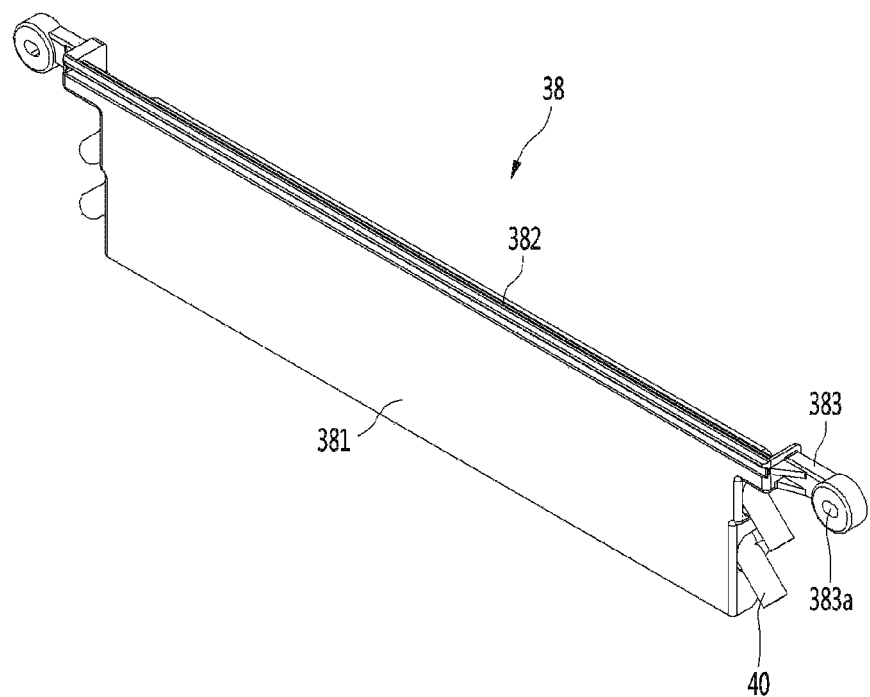

[Fig. 28]
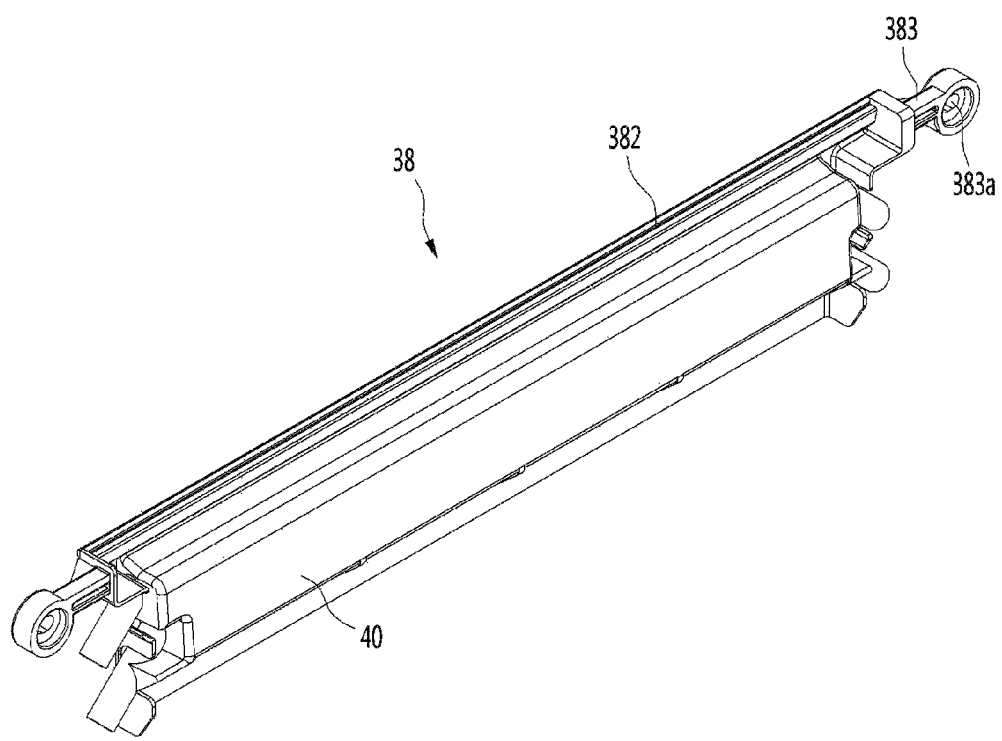

[Fig. 29]
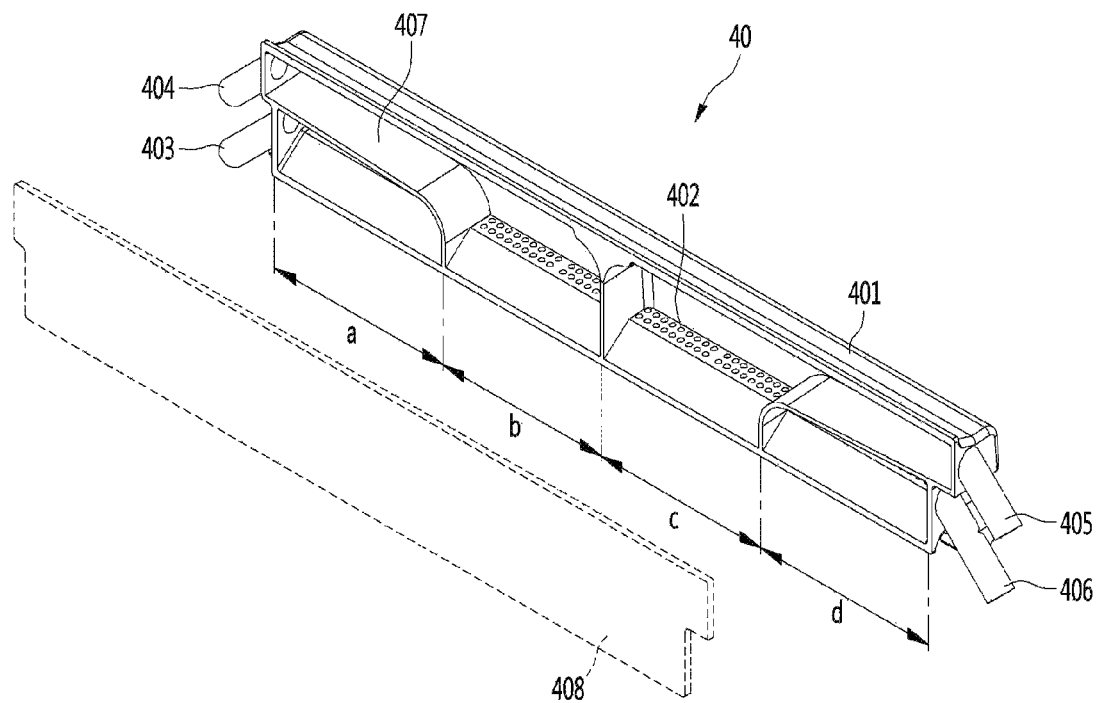

[Fig. 30]
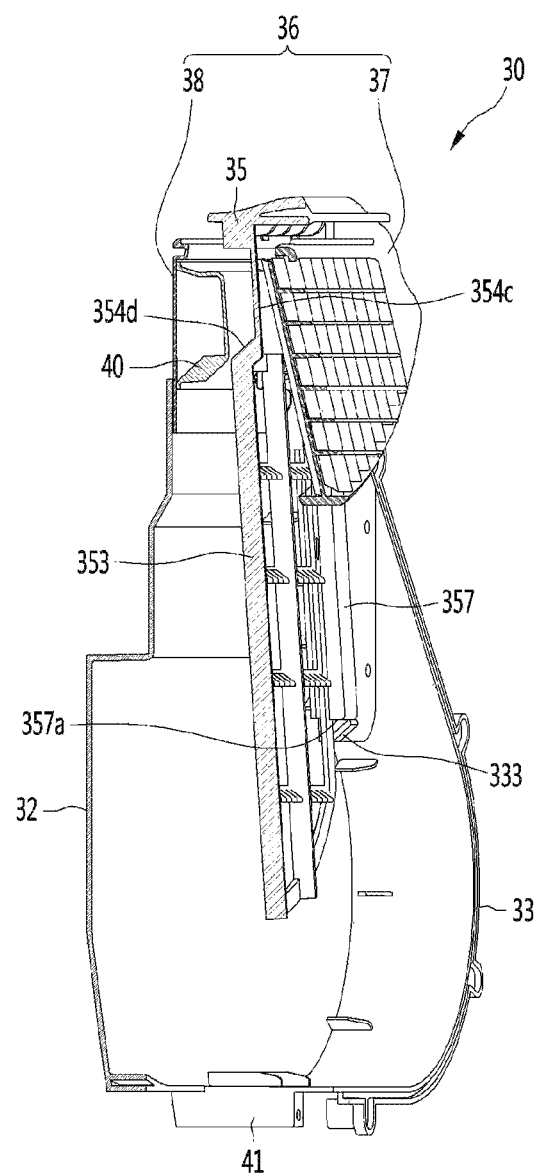

[Fig. 31]
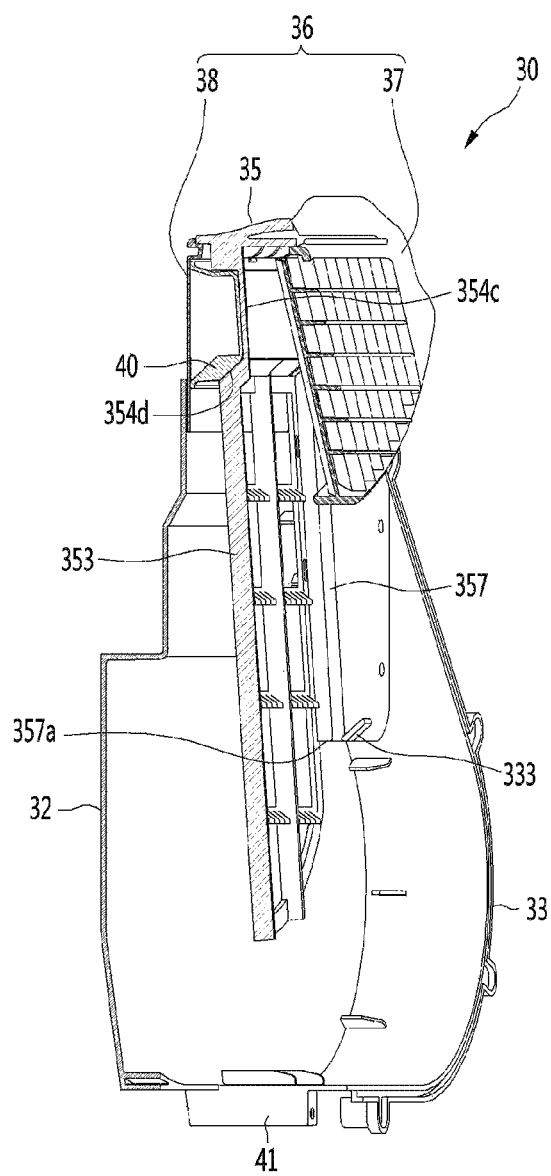

[Fig. 32]
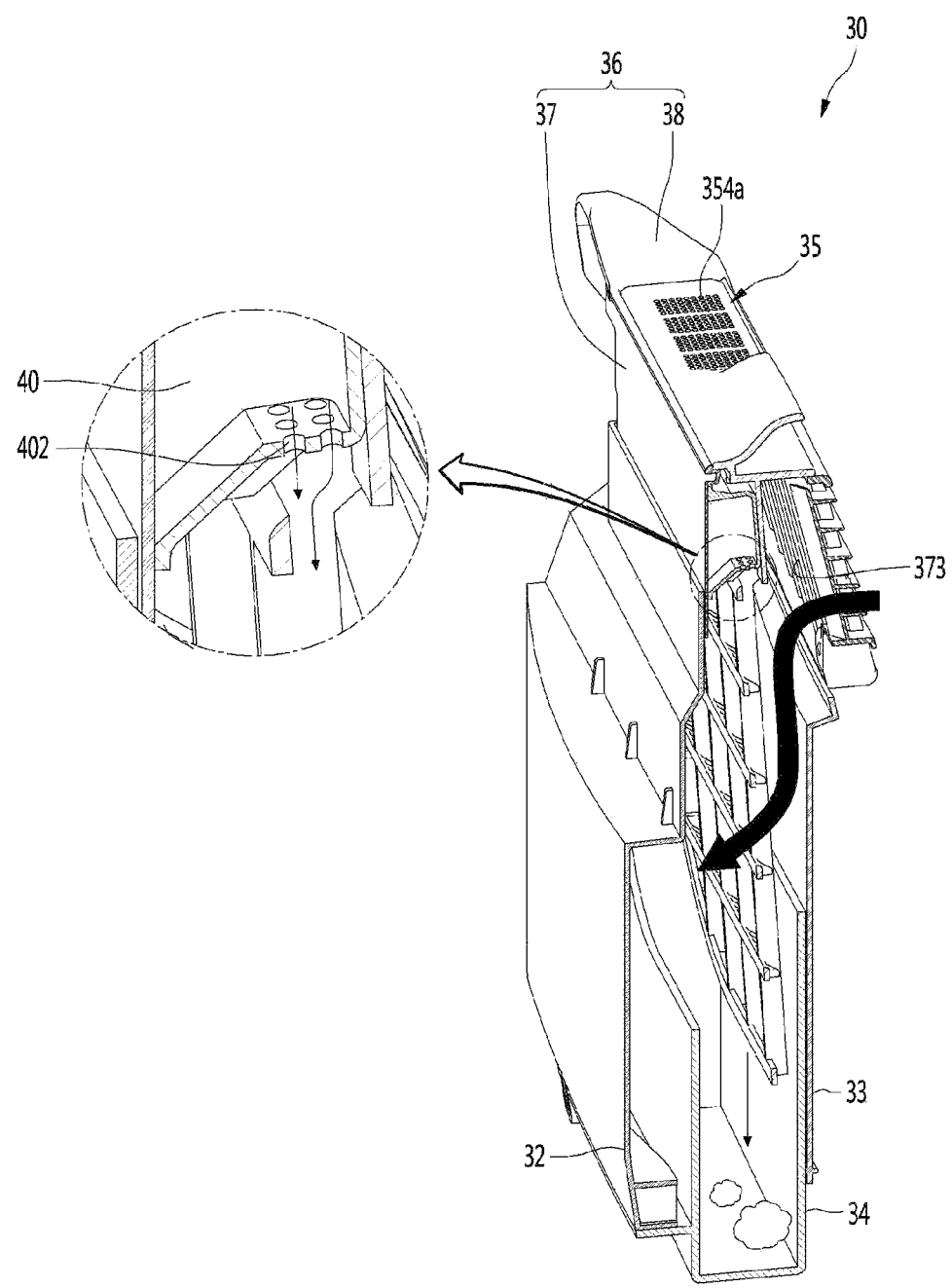

[Fig. 33]
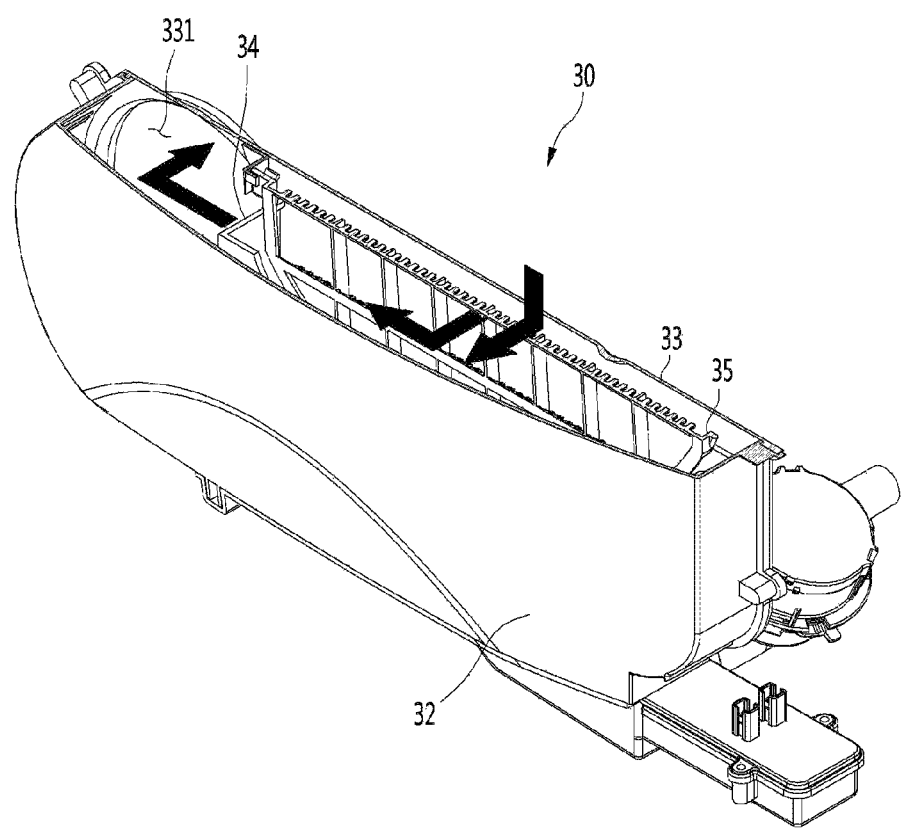

LAUNDRY DRYER

CROSS-REFERENCE TO RELATED APPLICATIONS

This application is the National Stage filing under U.S.C. § 371 of International Application No. PCT/KR2017/006041, filed on Jun. 9, 2017, which claims the benefit of earlier filing date and right of priority to Korean Application No. 10-2016-0078649, filed on Jun. 23, 2016, the contents of which are hereby incorporated by reference herein in their entirety.

TECHNICAL FIELD

The present invention relates to a laundry dryer.

BACKGROUND ART

Laundry dryer are home appliances that supply hot air into a drying drum to remove moisture absorbed into laundry in a state where objects to be dried are put into the rotating drum. The hot air supplied into the drying drum may be generated by combustion heat using electric resistance heat or a gas fuel or by a condenser constituting a heat pump cycle. Here, the hot air is supplied into the drying drum by driving a blower fan.

Also, laundry dryers may be classified into forced convection dryers and air-vented dryers according to a hot air supply method. In detail, the forced convection dryers may be dryers in which hot air supplied into a drying drum is repeatedly heated and cooled while circulating the inside of the dryer, and the air-vented dryers may be dryers in which hot air supplied into a drying drum is discharged from the drying drum to the outside.

Prior art disclosed in the following patent document discloses a lint filter cleaning device in which lint generated during the drying is collected into the filter, and the collected lint is separated from the filter by washing water.

According to the dryer provided with the lint filter cleaning device as described above, since the lint filter is capable of being periodically cleaned by a control part of a washing machine, user convenience may be improved.

Furthermore, there is an advantage that the problem that the drying air circulation passage is blocked by the lint or the problem that the lint trapped in the lint filter is ignited to cause fire are capable of being effectively prevented.

However, the dryer provided with the lint filter cleaning device that is disclosed in the prior art may have following problems. That is, the lint filter may be automatically cleaned, but the lint filter and the cleaning device are disposed in the vicinity of a central portion of the inside of a cabinet, and thus, it is impossible to separate the lint filter.

That is to say, when a replacement cycle of the lint filter occurs, or a problem occurs in the cleaning device, it is necessary to separate the lint filter so as to check conditions of the lint filter or the cleaning device. In this case, if the lint filter and the cleaning device are located at a deep portion within the cabinet, there is a problem that a side cabinet has to be separated to separate the lint filter.

PRIOR ART

Korean Patent Publication No. 10-2016-0006064

DISCLOSURE OF THE INVENTION

Technical Problem

The present disclosure has been proposed to improve the above-described limitations.

Technical Solution

To achieve the above object, a laundry dryer according to an embodiment of the present invention includes: a drying drum having an opening defined in a front surface thereof; a front cabinet erected on a front side of the drying drum and having an input hole defined in a portion corresponding to the opening; a filter assembly which is mounted on a rear surface of the front cabinet corresponding to a lower side of the input hole and through which humid air discharged from the drying drum passes, wherein the filter assembly includes: a case having an exhaust hole defined in a rear surface thereof; a blocking filter coupled to an upper portion of the case; a lint filter unit passing through the blocking filter so as to be slidably inserted or withdrawn in a vertical direction; a cleaning nozzle disposed at a front or rear side of the lint filter unit; and a filter housing accommodated in the case and disposed below the lint filter unit.

Advantageous Effects

According to the dryer having the above-described configuration according to the embodiment of the present invention, when there is a problem in the lint filter or when it is time to replace the lint filter with the new lint filter, the lint filter may be easily detached.

In addition, the lint filter cleaning device is in trouble, or the maintenance of the lint filter is required, the condition of the cleaning device may be easily checked after separating the lint filter.

BRIEF DESCRIPTION OF THE DRAWINGS

FIG. 1 is a right perspective view illustrating an internal structure of a dryer according to an embodiment of the present invention.

FIG. 2 is a left perspective view illustrating the internal structure of the dryer.

FIG. 3 is a front perspective view of a filter assembly according to an embodiment of the present invention.

FIG. 4 is a rear perspective view of the filter assembly.

FIG. 5 is an exploded perspective view of the filter assembly.

FIG. 6 is a front perspective view of the filter assembly from which a case is removed.

FIG. 7 is a front perspective view of a blocking filter constituting the filter assembly according to an embodiment of the present invention.

FIG. 8 is a front perspective view of a blocking body constituting the blocking filter according to an embodiment of the present invention.

FIG. 9 is a rear perspective view of the blocking body.

FIG. 10 is a front perspective view of a blocking cover constituting the blocking filter according to an embodiment of the present invention.

FIG. 11 is a rear perspective view of the blocking cover.

FIG. 12 is a front perspective view of a lint filter unit constituting a filter assembly according to an embodiment of the present invention.

FIG. 13 is a rear perspective view of the lint filter unit.

FIG. 14 is a perspective view of a cleaning nozzle according to an embodiment of the present invention.

FIG. 15 is a longitudinal cross-sectional view taken along line 15-15 of FIG. 14.

FIG. 16 is a front perspective view of a filter housing constituting the filter assembly according to an embodiment of the present invention.

FIG. 17 is a rear perspective view of the filter housing.

FIG. 18 is a longitudinal cutaway perspective view taken along line 18-18 of FIG. 3.

FIG. 19 is a transverse cutaway perspective view taken along 19-19 of FIG. 14.

FIG. 20 is a front perspective view of a filter assembly according to another embodiment of the present invention.

FIG. 21 is a rear perspective view of the filter assembly.

FIG. 22 is an exploded perspective view of the filter assembly.

FIG. 23 is a perspective view of the filter assembly from which a case is removed when viewed from a right side.

FIG. 24 is a perspective view of the filter assembly from which a front case is removed when viewed from a left side.

FIG. 25 is a front perspective view of a lint filter unit constituting the filter assembly according to another embodiment of the present invention.

FIG. 26 is a rear perspective view of the lint filter unit.

FIG. 27 is a front perspective view illustrating an assembly of a blocking cover and a cleaning nozzle according to another embodiment of the present invention.

FIG. 28 is a rear perspective view illustrating the assembly of the blocking cover and the cleaning nozzle.

FIG. 29 is a view illustrating an internal structure of the cleaning nozzle according to another embodiment of the present invention.

FIGS. 30 and 31 are cross-sectional views taken along line 30-30 of FIG. 20, i.e., side cross-sectional views illustrating a process of mounting the lint filter on the case according to an embodiment of the present invention.

FIG. 32 is a longitudinal cutaway perspective view taken along line 30-30 of FIG. 20, i.e., a view illustrating a state in which a lint filter unit is cleaned.

FIG. 33 is a transverse cutaway perspective taken along line 33-33 of FIG. 20.

MODE FOR CARRYING OUT THE INVENTION

Hereinafter, a dryer according to an embodiment of the present invention will be described in detail with reference to the accompanying drawings.

FIG. 1 is a right perspective view illustrating an internal structure of a dryer according to an embodiment of the present invention, and FIG. 2 is a left perspective view illustrating the internal structure of the dryer.

Referring to FIGS. 1 and 2, a dryer 10 according to an embodiment of the present invention may include a cabinet, a door 106 rotatably coupled to a front surface of the cabinet, and a drying drum 13 accommodated in the cabinet. A handle 106a may be disposed on one side of a front surface of the door 106.

In detail, the cabinet may include a base plate 100, a front cabinet 101 erected on a front end of the base plate 100, a rear cabinet 102 erected on a rear end of the base plate 100, a pair of side cabinets (not shown) connecting both ends of each of the front cabinet 101 and the rear cabinet 102 to each other, and a top plate 103 disposed on a top end of each of the front cabinet 101, the rear cabinet 102, and side frames.

In detail, an input hole 101a for inputting laundry is defined in the front cabinet 101. Also, the door 106 may be rotatably coupled to the front cabinet 101 to selectively open and close the input hole 101a by the door 106.

A filter assembly 30 is mounted on a rear surface of the front cabinet 10, particularly, between a lower end of the input hole 101a and a lower end of the front cabinet 101. A configuration and function of the filter assembly will be described below in more detail with reference to the accompanying drawings.

A control panel 104 may be mounted on an upper portion of the front surface of the front cabinet 101, particularly, between an upper end of the input hole 101a and an upper end of the front cabinet 101. A manipulation part for selecting an operation mode and a display part for displaying various kinds of information including an operation state may be disposed on the control panel 104.

Also, a drawer 105 for storing condensed water generated during the drying process may be mounted on a side of the control panel 104. The drawer 105 may pass through the front cabinet 101 so as to be inserted into or withdrawn from the cabinet.

A unit for generating hot air and a hot air supply passage supplying the hot air into the drying drum may be provided in the cabinet.

In detail, as described above, the unit for generating the hot air may include a gas combustion device, an electric heater, or a heat pump cycle. Also, the hot air supply passage may include a circulation-type supply passage and an exhaust-type supply passage.

In more detail, the exhaust-type supply passage may include a suction duct 11 disposed to extend in a forward and backward direction of the cabinet between a bottom surface of the drying drum 133 and the base plate 100, a rear duct 12 having an inlet connected to an outlet of the suction duct 11 and an outlet coupled to a rear surface of the drying drum 13, a guide duct mounted on a rear surface of the front cabinet 101 and having an inlet exposed to an opening of the drying drum 13, a drying fan 14 mounted on an outlet of the guide duct, and an exhaust duct 15 connected to an outlet of the drying fan 14 and passing through the rear cabinet 102 to communicate with an outside of the dryer. The drying fan 14 may be connected to a rotation shaft of a driving motor 141 that generates driving force for rotating the drying drum 13 to rotate together with the drying drum 13. Although not shown, a pulley may be connected to the rotation shaft of the driving motor 141, and a rotation belt is wound around an outer circumferential surface of the drying drum 13 to transmit the rotation force of the driving motor 141 to the drying drum 13.

A gas combustion device (not shown) of the hot air generation unit may be disposed on the inlet of the suction duct 11. Thus, air within the cabinet may be heated by the gas combustion device and then suctioned to the suction duct 11.

The electric heater of the hot air generation unit may be installed inside the rear duct 12. Thus, the air within the cabinet, which is introduced into the suction duct 11, may be heated by the electric heater while passing through the rear duct 12 and then be introduced into the drying drum 13.

The heat pump cycle of the hot air generation unit may include a condenser (not shown) that exchanges heat with a refrigerant to heat the air within the cabinet. The condenser may be disposed on the inlet of the suction duct 11 or inside the suction duct 11. Thus, the air heated by being heat-exchanged with the refrigerant while passing through the condenser may flow along the rear duct 12 and be supplied into the drying drum 13.

The hot air supplied into the drying drum 13 may dry laundry within the drying drum. Also, the high-temperature and high-humidity air absorbing moisture in the laundry drying process may pass through the guide duct and then be guided to the drying fan 14. Also, the air suctioned into the drying fan 14 may flow along the exhaust duct 15 and be discharged to the outside of the dryer 10.

Here, an evaporator constituting the heat pump cycle may be installed in the exhaust duct 15 to condense the high-temperature and high-humidity air flowing along the exhaust duct 15. Thus, the moisture contained in the air supplied from the exhaust duct 15 may be condensed, and low-temperature and dried air may be finally discharged to the outside of the dryer 10. A condensing unit for condensing the humid air flowing along the exhaust duct 15 may be provided as various units in addition to the evaporator. Also, the condensed water generated in the exhaust process may be collected into the drawer 105 by a condensation pump (not shown).

The filter assembly 30 according to an embodiment of the present invention may be mounted on the rear surface of the front cabinet 101. Also, the filter assembly 30 performs a function as the guide duct that guides the high-temperature and humid air discharged from the drying drum 13 and a function of filtering foreign substances including lint, which are contained in the high-temperature and humid air.

Hereinafter, a structure and function of the filter assembly 30 will be described in detail with reference to the accompanying drawings.

FIG. 3 is a front perspective view of the filter assembly according to an embodiment of the present invention, FIG. 4 is a rear perspective view of the filter assembly, and FIG. 5 is an exploded perspective view of the filter assembly.

Referring to FIGS. 3 to 5, the filter assembly 30 according to an embodiment of the present invention may include a case 31, a blocking filter 36 coupled to the case 31, a lint filter unit 35 slidably inserted into the blocking filter 36 and accommodated in the case 31, a cleaning nozzle 40 for cleaning the lint filter unit 35, a dryness sensor 39 mounted on a rear surface of the blocking filter 36, a filter housing 34 in which the lint filter unit 35 is accommodated, a drain tray 41 disposed on a lower end of the filter housing 34, a drain pump 43 connected to the drain tray 41 to drain washing water, and a water level sensor 42 detecting a level of the washing water collected in the drain tray 41. The water level sensor 42 may be mounted on a tray cover 411 covering an opened top surface of the drain tray 41.

In detail, the case 31 may perform a function as the guide duct that guides the humid air passing through the drying drum 13 to the drying fan 14 and also accommodate the lint filter unit 35 and the cleaning nozzle 40 therein.

The case 31 may include a front case 32 and a rear case 33 coupled to a rear end of the front case 32. Also, an exhaust hole 331 is defined in an edge of one side of the rear case 33. A suction end of the drying fan 14 may be disposed behind the exhaust hole 331 so that the humid air guided to the case 31 is discharged to an outside of the case 31.

Also, an opening is defined in a top surface of the case 31, and a portion of a lower portion of the blocking filter 36 descends through the opening and is accommodated in the case 31.

In detail, the blocking filter 36 may include a blocking body 37 and a blocking cover 38 coupled to a front end of the blocking body 37. Also, a lower end of the blocking cover 38 is seated on an upper end of a front surface of the case 31, and a portion of a lower portion of the blocking body 37 is inserted into the case 31.

Also, the lint filter unit 35 is inserted into the blocking filter 36, and a top surface of the lint filter unit 36 defines a portion of a top surface of the blocking filter 36. Also, the top surface of the blocking filter 36 may be rounded along an edge of a lower end of an inlet of the drying drum 13.

Also, a filter housing 34 for accommodating a portion of the lower end of the blocking body 37 is mounted inside the case 31. Also, a lower end of the lint filter unit 35 is placed on an upper end of the front surface of the filter housing 34.

Also, the drain tray 41 is disposed on a lower end of the filter housing 34. Also, a bottom surface of the drain tray 41 is inclined downward. A portion of a top surface of the drain tray 41 may have a size that is enough to accommodate the lower end of the lint filter unit 35. Thus, the washing water discharged from the cleaning nozzle 40 may flow together with the foreign substances detached from the lint filter unit 35 and be collected into the drain tray 41. Also, a portion of the top surface of the drain tray 41 is exposed to the outside of the case 31, and the exposed portion is covered by the tray cover 411. Also, the water level sensor 42 may be mounted on the tray cover 411.

FIG. 6 is a front perspective view of the filter assembly from which the case is removed.

Referring to FIG. 6, the lint filter unit 35 is placed on the upper end of the front surface of the filter housing, and the lint filter unit 35 passes through a top surface of the blocking filter 36. Also, the lint filter unit 35 slidably moves downward from a front side of the blocking body 37 and is mounted on the blocking filter 36.

Hereinafter, structures and functions of the blocking filter 36, the lint filter unit 35, and the filter housing 34 will be described in detail with reference to the accompanying drawings.

FIG. 7 is a front perspective view of the blocking filter constituting the filter assembly according to an embodiment of the present invention.

Referring to FIG. 7, as described above, the blocking filter 35 includes the blocking body 37 and the blocking cover 38 coupled to the upper portion of the front end of the blocking body 37. Also, a lint filter insertion hole 360 is defined between a top surface of the blocking cover 38 and a top surface of the blocking body 37. Also, the lint filter unit 35 is inserted through the lint filter insertion hole 360.

FIG. 8 is a front perspective view of the blocking body constituting the blocking filter according to an embodiment of the present invention, and FIG. 9 is a rear perspective view of the blocking body.

Referring to FIGS. 8 and 9, the blocking body 37 according to an embodiment of the present invention may include a lint filter cover 374 disposed behind the lint filter unit 35, a side cover 375 extending forward from each of both side ends of the lint filter cover 374 to define a side surface of the blocking body 37, a blocking louver 375 provided in an upper region of the lint filter cover 374, and a guide rib 376 bent from a front end of the side cover 375 to extend downward by a predetermined length.

In detail, when the lint filter unit 35 is inserted into the blocking filter 36, the side surface of the lint filter unit 35 is guided by the guide rib 376. In more detail, left and right edges of the lint filter unit 35 descend along a space defined between the lint filter cover 374 and the guide rib 376. Also, the guide rib 376 may restrict a side end of the front surface of the lint filter unit 35 to prevent the lint filter unit 35 from protruding forward while descending. Thus, the lint filter unit 35 may stably vertically descend by the guide rib 376 so as to be inserted into the blocking filter 36.

Also, the blocking louver 372 disposed above the lint filter cover 375 may be a lattice louver including vertical louvers 372a that extend vertically and horizontal ribs 372b that extend horizontally. The horizontal rib 372b may extend to be rounded along a shape of the top surface of the blocking body 37. Also, a plurality of blocking holes 373 may be defined by the vertical ribs 372a and the horizontal ribs 372b. The air within the drying drum 13 may be discharged toward the lint filter unit 35 through the blocking holes 373, and the foreign substance having a rod shape may not pass through the blocking filter 36 by the vertical ribs 372a and the horizontal ribs 372a.

Also, a plurality of air holes 371 are defined in the top surface of the blocking body 37, and air passing through the air hole 371 is guided to the lint filter unit 35.

The dryness sensor 39 may be mounted on a rear surface of the blocking body 37, which corresponds to a lower end of a portion on which the blocking louver 372 is disposed. An electrode part 391 is disposed on the dryness sensor 39 to detect a drying level of laundry contacting the electrode part 391.

Also, a coupling hook 378 protrudes from each of left and right edges of an upper end of the blocking body 37.

In detail, the coupling hook 378 may include an upper coupling hook 378b and a lower coupling hook 378a. The upper coupling hook 378b and the lower coupling hook 378a are spaced a predetermined distance from each other in a vertical direction.

Also, a portion of an upper portion of the side cover 375 may be recessed or stepped to form a blocking cover seating end 379.

Also, a coupling boss 377 may protrude from each of left and right edges of the upper end of the blocking body 37.

FIG. 10 is a front perspective view of the blocking cover constituting the blocking filter according to an embodiment of the present invention, and FIG. 11 is a rear perspective view of the blocking cover.

Referring to FIGS. 10 and 11, the blocking cover 38 according to an embodiment of the present invention is seated on an upper end of the front case 32.

In detail, a coupling hole 384 may be defined in each of left and right edges of a front surface part 381 of the blocking cover 38, and the coupling hole 384 includes an upper coupling hole 384b and a lower coupling hole 384a. The upper coupling hook 378b of the blocking body 37 is inserted into the upper coupling hole 384b, and the lower coupling hook 378a of the blocking body 37 is inserted into the lower coupling hole 384a.

Also, a coupling end 383 extends from each of the left and right edges of the blocking cover 38, and a coupling hole 383a is defined in an end of the coupling end 383. Also, the coupling member passing through the coupling hole 383a is inserted into the coupling boss 377 of the blocking body 37.

Also, a top surface part 382 of the blocking cover 38 may be rounded along a shape of the front surface of the drying drum 13.

FIG. 12 is a front perspective view of the lint filter unit constituting a filter assembly according to an embodiment of the present invention, and FIG. 13 is a rear perspective view of the lint filter unit.

Referring to FIGS. 12 and 13, the lint filter unit 35 according to an embodiment of the present invention may include a mesh-typed lint filter 351 and a filter frame 352 to which the lint filter 351 is attached to a front surface thereof.

In detail, the filter frame 352 may include a frame body 353 defining an outer appearance thereof, a frame head 354 formed on an upper end of the frame body 353, and vertical and horizontal ribs 355 and 356 having a lattice shape inside the frame body 353. The horizontal rib 356 may extend in a straight-line shape or extend to be rounded at a predetermined curvature.

Also, a handle 354b may be disposed on a central portion of the frame head 354, and a plurality of air holes 354a may be defined in a portion except for the handle 354b. Thus, the high-temperature and humid air discharged from the drying drum 13 may pass through the air holes 354a and then be introduced into the lint filter unit 35.

Also, a plurality of guide protrusions 356a may protrude from a rear surface of the horizontal rib 356. In detail, the plurality of guide protrusions 356a guide descending of a lump of the lint when the lump of the lint attached to the rear surface of the lint filter 51 is washed downward by the washing water. Thus, a top surface of each of the guide protrusion 356a may be inclined downward.

FIG. 14 is a perspective view of the cleaning nozzle according to an embodiment of the present invention, and FIG. 15 is a longitudinal cross-sectional view taken along line 15-15 of FIG. 14.

Referring to FIGS. 14 and 15, the cleaning nozzle 40 according to an embodiment of the present invention is disposed inside the blocking filter 36 and also disposed on the upper end of the rear portion of the lint filter unit 36.

In detail, the cleaning nozzle 40 may include a nozzle body 401 rounded to correspond to a shape of the front end of the drying drum 13 and a plurality of hose connection parts disposed on left and right ends of the nozzle body 401.

The hose connection parts may include first and second hose connection parts 403 and 404 disposed on the left end of the nozzle body 401 and third and fourth hose connection parts 405 and 406 disposed on the right end of the nozzle body 401.

Also, a plurality of partition ribs 407 may be disposed inside the nozzle body 401, and discharge regions respectively corresponding to the hole connection parts 403 to 406 may be partitioned inside the nozzle body 401 by the partition ribs 407. That is, a first discharge region a, a second discharge region b, a third discharge region c, and a fourth discharge region d may be partitioned inside the nozzle boy 401. The first to fourth discharge regions may be connected to the first to fourth hose connection parts, respectively.

Also, a plurality of discharge holes 402 may be defined in the front surface of the nozzle body 401 corresponding to the discharge regions. That is, each of the plurality of discharge holes 402 may be defined for each region.

Also, the plurality of hose connection parts may be connected to a control valve (not shown), and water may be sequentially supplied to the hose connection parts by an operation of the control valve.

In detail, when the washing water is supplied at the same time to the plurality of hose connection parts, the lumps of the lint attached to the lint filter unit 35 may be separated at once and cornered to the drain pump 43. As a result, the drain pump may be blocked. To solve this problem, the supply of the washing water through the plurality of hose connection parts may be sequentially performed with a time difference. Thus, since the washing water is sequentially supplied to the first to fourth discharge regions with the time difference, the lint attached to the lint filter unit 35 may not be separated at once but be separated little by little. Here, the order of the washing water injection may vary depending on how the control algorithm is constructed. As one method, it is possible to supply the washing water in an order of the first discharge region→the third discharge region→the second discharge region→the fourth discharge region, but is not limited thereto.

FIG. 16 is a front perspective view of the filter housing constituting the filter assembly according to an embodiment of the present invention, and FIG. 17 is a rear perspective view of the filter housing.

Referring to FIGS. 16 and 17, the filter housing 34 according to an embodiment of the present invention may include a front surface part 341, a rear surface part 342, and side and bottom surface parts 343 and 344, which connect the front surface part 341 to the rear surface part 342. Also, an opening 345 is defined in the top surface part of the filter housing 34, and a portion of the lint filter unit 35 and a portion of the blocking filter 36 may be inserted into the opening 345. Also, the drain tray 41 is defined at one side of the bottom surface part 344.

In detail, a recess part 346 that is recessed by a predetermined depth may be defined in an upper end of the front surface part 342. The recess part 342 may be formed along a contour of the lower end of the lint filter unit 35. Also, when the lint filter unit 35 is completely installed, the lower end of the lint filter unit 35 may contact the recess part 342.

FIG. 18 is a longitudinal cutaway perspective view taken along line 18-18 of FIG. 3, and FIG. 19 is a transverse cutaway perspective view taken along 19-19 of FIG. 14.

Referring to FIGS. 18 and 19, the high-temperature and humid air introduced into air holes 345a and 371 defined in the top surface of the lint filter unit 35 and the blocking body 37 and the blocking hole 373 defined in the upper portion of the blocking body 37 may descend within the case 31 to pass through the lint filter unit 35.

In detail, the air may flow from the front side to the rear side of the lint filter unit 35. In this process, the lint contained in the air may be attached to be caught to the rear surface of the lint filter unit 35.

Also, as illustrated in FIG. 19, the air passing through the lint filter unit 35 may flow towards the front case 32 and be guided toward the drying fan 14 through the exhaust hole 331 defined in the rear case 33.

The washing water supplied to the cleaning nozzle 40 is discharged through a discharge hole 402 defined in a front surface of the cleaning nozzle 40. The washing water discharged through the discharge hole 402 flows along the rear surface of the lint filter unit 35. Also, the lumps of the lint attached to the rear surface of the lint filter 351 may be separated to drop down by the washing water flowing along the rear surface of the lint filter unit 35.

Also, the lumps of the dropping lint may be collected into the drain tray 41 together with the washing water. Also, the lumps of the lint and the washing water collected into the drain tray 41 may be discharged to the outside of the dryer or transferred to the drawer 105 by the drain pump 43.

The lint filter unit 35 may slidably move from the filter assembly 30 in the vertical direction and thus be attached and detached. Particularly, the lint filter unit 35 is inserted into the case 31 through the lint filter insertion hole 360 defined in the top surface of the blocking filter 36. Also, the cleaning nozzle 40 may be disposed behind the lint filter unit 35 to prevent the lint filter unit 35 from interfering when the lint filter unit 35 is separated or inserted.

Thus, to replace or repair the lint filter unit 35 by a user, the user may open the door of the dryer 10 to easily separate the lint filter unit 35 upward.

FIG. 20 is a front perspective view of a filter assembly according to another embodiment of the present invention, FIG. 21 is a rear perspective view of the filter assembly, and FIG. 22 is an exploded perspective view of the filter assembly.

Hereinafter, the same reference numerals are assigned to the same components as those of the previous embodiment, and duplicated description of the same components will be omitted.

Referring to FIGS. 20 to 22, like the foregoing embodiment, a filter assembly 30 according to this embodiment may include a case 31, a blocking filter 36, a lint filter unit 35, a filter housing 34, a cleaning nozzle 40, a dryness sensor 39, a drain tray 41, a drain pump 43, and a water level sensor 42.

Also, like the foregoing embodiment, the case 31 is constituted by a front case 32 and a rear case 33.

In detail, like the foregoing embodiment, the blocking filter 36 is constituted by a blocking body 37 and a blocking cover 38. The lint filter unit 35 is slidably inserted through a top surface of the blocking filter 36.

However, unlike the foregoing embodiment, the top surface of the filter assembly 30 may not be rounded along a curvature of an inlet of a drying drum but be horizontally disposed. That is, this embodiment is different from the foregoing embodiment in that a top surface of the lint filter unit 35 and a top surface of the blocking filter 36 extend horizontally.

Also, this embodiment is different from the foregoing embodiment in that a filter guide 332 is mounted on one side of left and right sides of a front surface of the rear case 33 to guide vertical and slidable movement of the lint filter unit 35. Also, an inclined rib 333 may be disposed on a lower end of the filter guide 332. Thus, when lint filter unit 35 is inserted into the case 31, the lint filter unit 35 may be closely attached to the cleaning nozzle 40.

A function of the inclined rib 333 will be described below in more detail with reference to the accompanying drawings. Also, Although the filter guide 332 is provided on only a left edge of the rear case 33, this embodiment is not limited thereto. For example, the filter guide 332 may be provided on each of left and right edges of the rear case 33, to guide left and right edges of the lint filter unit 35 at the same time.

FIG. 23 is a perspective view of the filter assembly from which the case is removed when viewed from a right side, and FIG. 24 is a perspective view of the filter assembly from which the front case is removed when viewed from a left side.

Referring to FIGS. 23 and 24, like the foregoing embodiment, in the filter assembly according to this embodiment, the lint filter unit 35 is fitted into the blocking filter 36, and the filter housing 34 is disposed below the lint filter unit 35. Also, like the foregoing embodiment, an upper end of a front surface of the filter housing 34 is recessed.

However, this embodiment is different from the foregoing embodiment in that the lint filter unit 35 is guided by the filter guide 332 provided on the rear case 33 and then inserted into the case 31 or withdrawn from the case 31.

FIG. 25 is a front perspective view of the lint filter unit constituting the filter assembly according to another embodiment of the present invention, and FIG. 26 is a rear perspective view of the lint filter unit.

Referring to FIGS. 25 and 26, like the foregoing embodiment, the lint filter unit 35 according to this embodiment may include a mesh-typed lint filter 351 and a filter frame 352 to which the lint filter 351 is attached.

In detail, the filter frame 352 may include a frame body 353 defining an outer appearance thereof, a frame head 354 disposed on an upper end of the frame body 353, and vertical and horizontal ribs 355 and 356 having a lattice shape inside the frame body 353. According to this embodiment, unlike the foregoing embodiment, the horizontal rib 356 may not be rounded but horizontally extend in a straight-line shape. This is done because the frame head 354 is not rounded but extend horizontally.

Also, a slide guide 357 may be disposed on one side end of the frame body 353. The slide guide 357 may extend backward from a side end of the frame body 353 and then be bent to extend in a lateral direction. Also, the slide guide 357 is fitted into the filter guide 332 disposed on the rear case 33. Also, a lower end of the slide guide 357 may be defined as a contact end 357a. This is done because, when the link filter unit 35 is mounted, the contact end 357a contacts the inclined rib 333 disposed on a lower end of the slide guide 357. Also, in a state where the contact end 357a contacts an upper end of the inclined rib 333, when the lint filter unit 35 further descends, the lint filter unit 35 may be pressed forward by the inclined rib 333. This will be described in more detail with reference to the accompanying drawings.

The frame head 354 may include an extension part 354c further extending upward from an upper end of the frame body 353 and a cover part 354e horizontally disposed on an upper end of the extension part 354c. Also, a handle 354b is disposed on a center of the cover part 354e, and a plurality of air holes 354a are defined in the cover part 354e except for the handle 354b.

Also, the extension part 354c extends upward from a rear end of a top surface of the slide guide 357, and the top surface of the slide guide 357 has an inclined surface that is gradually inclined downward toward the front surface thereof. Although described below, an edge portion at which a rear surface and a bottom surface of the cleaning nozzle 40 meet each other may also be inclined at the same angle as the inclined surface 354d and thus be closely attached to the inclined surface 354d.

FIG. 27 is a front perspective view illustrating an assembly of the blocking cover and the cleaning nozzle according to another embodiment of the present invention, and FIG. 28 is a rear perspective view illustrating the assembly of the blocking cover and the cleaning nozzle.

Referring to FIGS. 27 and 28, this embodiment is different from the foregoing embodiment in that a top surface part 382 of the blocking cover 38 extends horizontally. However, like the foregoing embodiment, and an extension end 383 is disposed on each of both side ends of the blocking cover 38, and a coupling hole 383a is defined in an end of the extension end 383.

Also, this is different from the foregoing embodiment in that the cleaning nozzle 40 is closely attached to a rear surface of the front surface part of the blocking cover 38. That is, in the forgoing embodiment, the cleaning nozzle 40 is disposed behind the lint filter unit. However, according to this embodiment, the cleaning nozzle 40 may be disposed at a front side of the lint filter unit 35 and be closely attached to the rear surface of the blocking cover 38.

In addition, the front surface of the cleaning nozzle 40 is opened and also is covered by the blocking cover 38. Alternatively, to previously prevent water from leaking, like the forgoing embodiment, the cleaning nozzle 40 may be manufactured in a single injection molded shape.

FIG. 29 is a view illustrating an internal structure of the cleaning nozzle according to another embodiment of the present invention.

Referring to FIG. 29, the cleaning nozzle 40 according to this embodiment may not be rounded but extend in a straight-line shape.

In detail, the cleaning nozzle 40 may include a nozzle body 401 extending in the straight-line shape and a plurality of hose connection parts disposed on left and right ends of the nozzle body 401.

The hose connection parts may include first and second hose connection parts 403 and 404 disposed on the left end of the nozzle body 401 and third and fourth hose connection parts 405 and 406 disposed on the right end of the nozzle body 401.

Also, a plurality of partition ribs 407 may be disposed inside the nozzle body 401, and discharge regions respectively corresponding to the hole connection parts 403 to 406 may be partitioned inside the nozzle body 401 by the partition ribs 407. That is, a first discharge region a, a second discharge region b, a third discharge region c, and a fourth discharge region d may be partitioned inside the nozzle boy 401. The first to fourth discharge regions may be connected to the first to fourth hose connection parts, respectively.

Also, a plurality of discharge holes 402 may be defined in the front surface of the nozzle body 401 corresponding to the discharge regions. That is, each of the plurality of discharge holes 402 may be defined for each region.

Also, the plurality of hose connection parts may be connected to a control valve (not shown), and water may be sequentially supplied to the hose connection parts by an operation of the control valve. This structure is the same as that described with reference to FIG. 15 according to the foregoing embodiment, and thus, its duplicated description will be omitted.

FIGS. 30 and 31 are cross-sectional views taken along line 30-30 of FIG. 20, i.e., side cross-sectional views illustrating a process of mounting the lint filter on the case according to an embodiment of the present invention.

Referring to FIG. 30, the lint filter unit 35 is erected to be inserted into a lint filter insertion hole of the blocking filter 36. Thus, the slide guide 357 disposed on a side surface of the lint filter unit 35 is inserted into the filter guide 332. Also, the slide guide 357 descends along the filter guide 332, and a lower end of the slide guide 357, i.e., the contact end 357a contacts an upper end of the inclined rib 333. In this state, the lint filter unit 35 is disposed at a position closer to the blocking body 37 than the blocking cover 38.

Referring to FIG. 31, in the state in which the contact end 357a contacts the upper end of the inclined rib 333, when the lint filter unit 35 further descends, the contact end 357a descends along the inclined rib 333 to move forward. As a result, the lint filter unit 35 may descend and also move forward to be closely attached to the rear surface of the cleaning nozzle 40. Also, since the edge of the lower end of the rear surface of the cleaning nozzle 40 is inclined at the same angle as the inclined surface 354d of the lint filter unit 35, the front surface part of the upper portion of the lint filter unit 35 is closely attached to the rear surface of the cleaning nozzle 40, and also, the inclined surface 354d is closely attached to the edge of the lower end of the rear surface of the cleaning nozzle 40. As a result, a discharge hole 402 of the cleaning nozzle 40 may be defined directly above the lint filter 351, and thus, washing water discharged from the discharge hole 402 may separate a lump of lint attached to the rear surface of the lint filter 351 from the lint filter 351.

To separate the lint filter unit 35, the handle 354b is held to be pulled upward. Thus, the lint filter unit 35 ascends while moving backward by the inclined surface 354d. Also, the lint filter unit 35 vertically moves upward from just the moment when the lower end of the inclined surface 354d is separated from the cleaning nozzle 40.

FIG. 32 is a longitudinal cutaway perspective view taken along line 30-30 of FIG. 20, i.e., a view illustrating a state in which the lint filter unit is cleaned, and FIG. 33 is a transverse cutaway perspective taken along line 33-33 of FIG. 20.

Referring to FIGS. 32 and 33, air introduced through a blocking hole 373 of the blocking filter 36 and an air hole 354d of the lint filter unit 35 is guided into the case 31. Then, the air guided into the case 31 passes through the lint filter unit 35 while moving forward from a rear side of the lint filter unit 35. Also, the air passing through the lint filter unit 35 flows to a side of the case 31 and then is discharged through the exhaust hole 331 and introduced into the drying fan 14.

Also, in a process of cleaning the lint filter, the washing water is discharged from the discharge hole 402 of the cleaning nozzle 40. The discharged washing water separates the lint attached to the rear surface of the lint filter 351 while flowing down to the lint filter unit 35. Then, the separated lump of the lint is guided to the drain tray 41 and then discharged to the outside by the drain pump 43.

According to this embodiment, the discharge hole 402 of the cleaning nozzle 40 may be defined directly above the lint filter unit 35 but may not be defined in the rear side of the lint filter unit 35, and thus, the washing water discharged from the discharge hole 402 may easily flow down to the lint filter 351.

The invention claimed is:

1. A laundry dryer comprising:
a drying drum having an opening defined in a front surface thereof;
a front cabinet erected on a front side of the drying drum and having an input hole defined in a portion corresponding to the opening;
a filter assembly which is mounted on a rear surface of the front cabinet corresponding to a lower side of the input hole and through which humid air discharged from the drying drum passes,
wherein the filter assembly comprises:
a case having an exhaust hole defined in a rear surface thereof;
a blocking filter coupled to an upper portion of the case;
a lint filter unit passing through the blocking filter so as to be slidably inserted or withdrawn in a vertical direction;
a cleaning nozzle disposed at a front or rear side of the lint filter unit; and
a filter housing accommodated in the case and disposed below the lint filter unit,
wherein the blocking filter comprises:
a blocking body; and
a blocking cover coupled to a front surface of the blocking body,
wherein a lint filter insertion hole is defined between a top surface of the blocking body and a top surface of the blocking cover, and
the lint filter insertion hole is covered by a top surface of the lint filter unit,
wherein the case comprises:
a rear case having an exhaust hole;
a front case coupled to a front surface of the rear case;
a filter guide disposed on one side of the front surface of the rear case to guide the slidable movement of the lint filter unit; and
an inclined rib disposed on a lower end of the filter guide and gradually inclined downward from the front surface of the rear case forward,
wherein the lint filter unit comprises:
a lint filter having a mesh shape;
a filter frame having a front surface to which the lint filter is attached; and
a slide guide disposed on one end of the filter frame and inserted into the filter guide to guide the movement of the lint filter unit,
wherein, when the lint filter unit is inserted into the case, a lower end of the slide guide moves along the inclined rib so that the lint filter unit descends while moving forward;
wherein the filter frame comprises:
a frame body defining an outer appearance of the filter frame;
ribs provided in a lattice shape inside the frame body; and
a frame head disposed on an upper end of the frame body,
wherein the upper end of the frame body has an inclined surface that is inclined at the same inclined angle as the inclined rib.

2. The laundry dryer according to claim 1, wherein the cleaning nozzle is coupled to be closely attached to a rear surface of the blocking cover, and
a plurality of discharge holes are defined in a bottom surface of the cleaning nozzle.

3. The laundry dryer according to claim 1, wherein, when the lint filter unit is separated upward from the case, the inclined surface moves in a state of contacting a lower end of the cleaning nozzle so that the lint filter unit ascends while moving backward.

4. The laundry dryer according to claim 3, wherein the lower end of the cleaning nozzle, which is in contact with the inclined surface, is inclined to the same angle of the inclined surface.

5. The laundry dryer according to claim 1, further comprising:
a drain tray disposed on a lower end of the filter housing;
a drain pump to drain a washing water collected in the drain tray.

6. The laundry dryer according to claim 5, wherein a bottom surface of the drain tray is inclined downward towards the drain pump.

7. The laundry dryer according to claim 5, further comprising a water level sensor to detect a level of the washing water collected in the drain tray.

8. The laundry dryer according to claim 1, wherein the frame head includes:
an extension part further extending upward from an upper end of the frame body;
a cover part horizontally extending on an upper end of the extension part; and
a handle disposed on a center of the cover part.

9. The laundry dryer according to claim 8, wherein a plurality of air holes are defined in the cover part except for the handle.

10. The laundry dryer according to claim 9, wherein the cleaning nozzle is closely attached to a rear surface of the blocking cover at a position which is ahead of the extension part, such that the air passing through the air holes flows downwardly to an upper surface of the cleaning nozzle and flows to a rear side of the lint filter unit.

11. The laundry dryer according to claim 10, wherein the cleaning nozzle includes:
a nozzle body;
first and second hose connection parts disposed on one of left and right ends of the nozzle body;
third and fourth hose connection parts disposed on the other of left and right ends of the nozzle body;

a plurality of partition ribs disposed at an inside the nozzle body,
wherein the inside of the nozzle body is partitioned to four discharge regions, and
the four hose connection parts are respectively connected to the four discharge regions.

12. The laundry dryer according to claim 8, wherein the cleaning nozzle is disposed at a space formed between the cover part and the upper end of the frame body.

13. The laundry dryer according to claim 1, wherein the ribs includes horizontal ribs and vertical ribs,
and wherein the filter frame further includes a plurality of guide protrusions protruding from a rear surface of horizontal ribs to be downwardly slanted.

\* \* \* \* \*